US012154242B1

(12) United States Patent
Thivierge

(10) Patent No.: US 12,154,242 B1
(45) Date of Patent: Nov. 26, 2024

(54) VARYING SNAP LOCATION DENSITIES IN AN ENVIRONMENT

(71) Applicant: Apple Inc., Cupertino, CA (US)

(72) Inventor: Eric G. Thivierge, Merchantville, NJ (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/373,671

(22) Filed: Jul. 12, 2021

Related U.S. Application Data

(60) Provisional application No. 63/061,716, filed on Aug. 5, 2020.

(51) Int. Cl.
*G06T 19/20* (2011.01)
*G06T 17/10* (2006.01)
*G06T 19/00* (2011.01)

(52) U.S. Cl.
CPC .............. *G06T 19/20* (2013.01); *G06T 17/10* (2013.01); *G06T 19/006* (2013.01); *G06T 2219/2004* (2013.01)

(58) Field of Classification Search
None
See application file for complete search history.

(56) References Cited

U.S. PATENT DOCUMENTS 6,426,745 B1 * 7/2002 Isaacs ................. G06F 3/04845 345/619
2010/0103439 A1 * 4/2010 Zak ...................... H04N 1/0044 358/1.9
2011/0043517 A1 * 2/2011 Schneider ........... G06F 3/04847 345/666
2014/0096012 A1 * 4/2014 Grosz ................. G06F 3/04845 715/733
2014/0306993 A1 * 10/2014 Poulos .................. G06T 19/006 345/633
2016/0189426 A1 * 6/2016 Thomas .................. G06F 3/011 345/633
2016/0320625 A1 * 11/2016 von und zu Liechtenstein ........... G02B 27/0179
2019/0018498 A1 * 1/2019 West ........................ G06F 3/012
2020/0082629 A1 * 3/2020 Jones ................. G02B 27/0172
2020/0379626 A1 12/2020 Guyomard et al.
2020/0387289 A1 * 12/2020 Dunn ...................... G06T 19/20
2023/0325046 A1 * 10/2023 De Almeida e de Vincenzo ........ G06T 19/006 715/848

OTHER PUBLICATIONS

"Introducing RealityKit and Reality Composer", Apple Developer [online]. Apple Inc., Jun. 3, 2019 [retrieved on Feb. 16, 2022]. Retrieved from the Internet: <https://developer.apple.com/videos/play/wwdc2019/603>.

* cited by examiner

*Primary Examiner* — Michael J Cobb
(74) *Attorney, Agent, or Firm* — Kubota & Basol LLP

(57) ABSTRACT

A computer-generated environment can provide a plurality of snap points to guide a user while the user performs one or more transformations to an object. Snap points may be non-uniformly distributed. Snap point densities may vary. Snap points may vary as a function of characteristics of the object. Snap points may be exported, disassociated from the object, and/or used for other objects or other locations of the computer-generated environment.

24 Claims, 14 Drawing Sheets

600
602
604
606
608

VARYING SNAP LOCATION DENSITIES IN AN ENVIRONMENT

CROSS-REFERENCE TO RELATED APPLICATIONS

This application claims the benefit of U.S. Provisional Application No. 63/061,716, filed Aug. 5, 2020, the content of which is incorporated herein by reference in its entirety for all purposes.

FIELD OF THE DISCLOSURE

This relates generally to computer graphics editors.

BACKGROUND OF THE DISCLOSURE

Extended reality (XR) environments provide two-dimensional and/or three-dimensional environments where at least some objects displayed for a user's viewing are generated by a computer. In some uses, a user may create or modify XR environments, such as by editing, generating, or otherwise manipulating computer-generated objects using a content generation environment, such as a graphics editor or graphics editing interface. Editors that allow for intuitive editing of computer-generated objects are desirable.

SUMMARY OF THE DISCLOSURE

Some embodiments described in this disclosure are directed to providing varying snap location (e.g., snap point) densities in a content generation environment. In some embodiments, a snap location allows a user to easily align objects with respective snap locations in the content generation environment (e.g., while moving, resizing, or otherwise manipulating objects in the content generation environment). In some embodiments, the snap locations may be non-uniformly distributed or the density of snap locations may vary in the content generation environment. For example, the density of snap locations may be lower in areas of the content generation environment where minute or fine adjustments are less likely to be used and may be higher in areas of the content generation environment where minute or fine adjustments are more likely to be used. In some embodiments, the snap locations may be associated with an object and the density varies as a function of one or more characteristics of the object, such as distance from one or more boundaries or points of interest. In some embodiments, snap locations for an object with varying densities can be automatically generated, manually generated, and/or manually edited. In some embodiments, the snap locations can be exported, disassociated from the object, and used for other objects or other locations of a content generation environment.

The full descriptions of the embodiments are provided in the Drawings and the Detailed Description, and it is understood that this Summary does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals often refer to corresponding parts throughout the figures.

DETAILED DESCRIPTION

Figure 1:
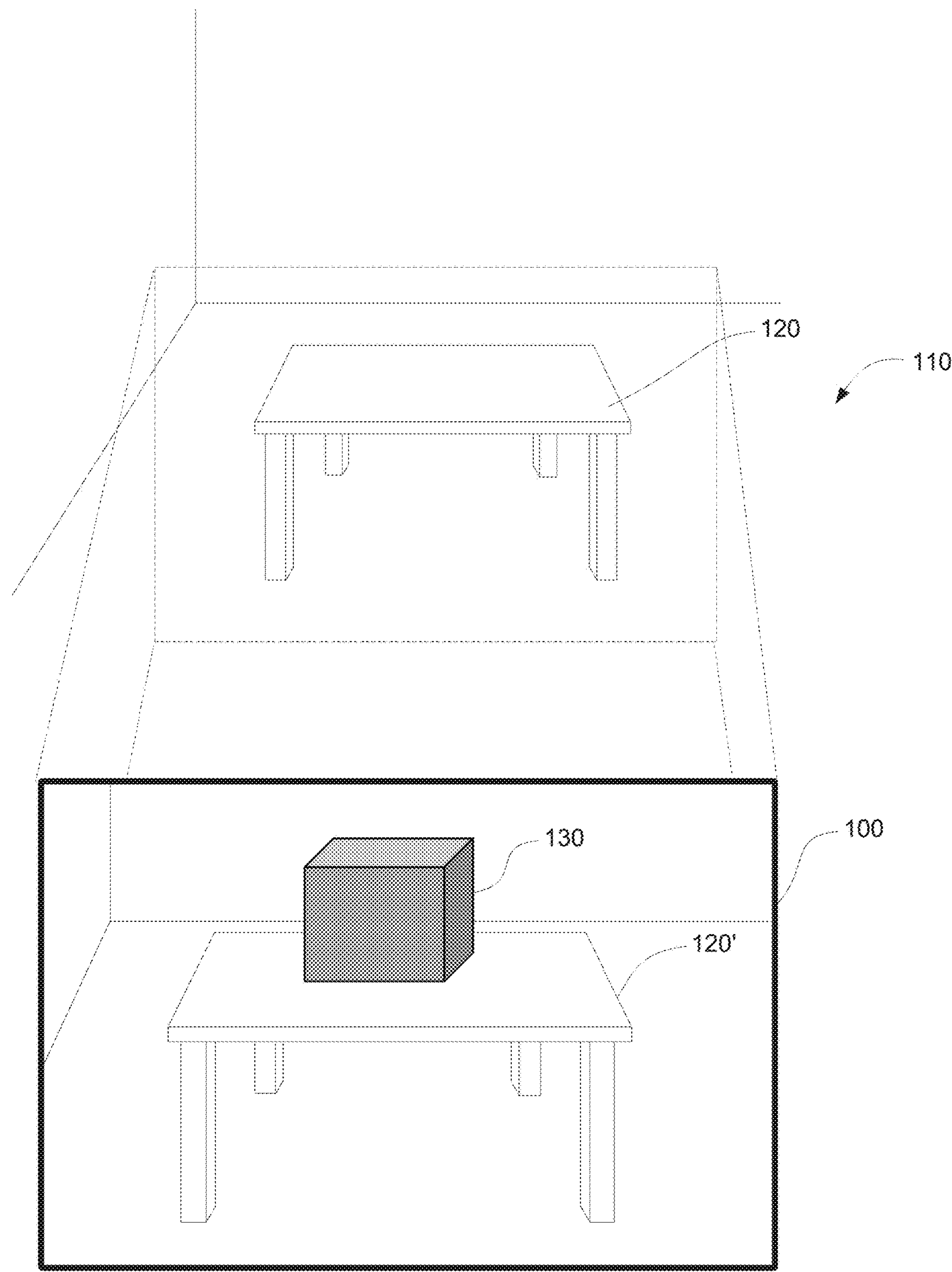
FIG. 1 illustrates an electronic device displaying XR content according to embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a respective snap point could be referred to as a "first" or "second" snap point, without implying that the respective snap point has different characteristics based merely on the fact that the respective snap point is referred to as a "first" or "second" snap point. On the other hand, a snap point referred to as a "first" snap point and a snap point referred to as a "second" snap point are both snap points, but are not the same snap point, unless explicitly described as such.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some embodiments, XR content can be presented to the user via a XR file that includes data representing the XR content and/or data describing how the XR content is to be presented. In some embodiments, the XR file includes data representing one or more XR scenes and one or more triggers for presentation of the one or more XR scenes. For example, a XR scene may be anchored to a horizontal, planar surface, such that when a horizontal, planar surface is detected (e.g., in the field of view of one or more cameras), the XR scene can be presented. The XR file can also include data regarding one or more objects (e.g., virtual objects) associated with the XR scene, and/or associated triggers and actions involving the XR objects.

In order to simplify the generation of XR files and/or editing of computer-generated graphics generally, a computer graphics editor including a content generation environment (e.g., an authoring environment graphical user interface (GUI)) can be used. In some embodiments, a content generation environment is itself a XR environment (e.g., a two-dimensional and/or three-dimensional environment). In such a content generation environment, a user can create objects from scratch (including the appearance of the objects, behaviors/actions of the objects, and/or triggers for the behaviors/actions of the objects). Additionally or alternatively, objects can be created by other content creators and imported into the content generation environment, where the objects can be placed into a XR environment or scene. In some embodiments, objects generated in a content generation environment or entire environments can be exported to other environments or XR scenes (e.g., via generating an XR file and importing or opening the XR file in a computer graphics editor application or XR viewer application).

In some embodiments, the content generation environment can enable a user to perform one or more transformations of an object, such as relocating (e.g., moving), rotating, resizing, etc. In some embodiments, the content generation environment can provide a plurality of snap points (e.g., snap locations) to guide a user while performing one or more transformations to an object. For example, while moving an object, the object can "snap" to one or more of the provided snap points (e.g., when the object is moved to within a threshold distance (a "hit zone") of the respective snap point). Similarly, while resizing an object (for example, by moving a boundary of the object), a user can move a boundary of the object (e.g., while one or more of the other boundaries of the object remains at their original positions) and cause the boundary to "snap" to one or more of the provided snap points. Thus, snap points can be used for resizing operations. The provided snap points can be used for other types of object manipulations not explicitly described herein. As described herein, snap "points" can be referred to as snap "locations".

Embodiments of electronic devices and user interfaces for such devices are described. In some embodiments, the device is a portable communications device, such as a laptop or tablet computer. In some embodiments, the device is a mobile telephone that also contains other functions, such as personal digital assistant (PDA) and/or music player functions. In some embodiments, the device is a wearable device, such as a watch, a head-mounted display, etc. It should also be understood that, in some embodiments, the device is not a portable communications device, but is a desktop computer or a television. In some embodiments, the portable and non-portable electronic devices may optionally include with touch-sensitive surfaces (e.g., touch screen displays and/or touch pads). In some embodiments, the device does not include a touch-sensitive surface (e.g., a touch screen display and/or a touch pad), but rather is capable of outputting display information (such as the user interfaces of the disclosure) for display on a separate display device, and capable of receiving input information from a separate input device having one or more input mechanisms (such as one or more buttons, a mouse, a touch screen display and/or a touch pad). In some embodiments, the device has a display, but is capable of receiving input information from a separate input device having one or more input mechanisms (such as one or more buttons, a mouse, a touch screen display and/or a touch pad).

In the discussion that follows, an electronic device that is in communication with a display and one or more input devices is described. It should be understood, that the electronic device optionally is in communication with one or more other physical user-interface devices, such as touch-sensitive surface, a physical keyboard, a mouse, a joystick, a hand tracking device, an eye tracking device, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application. Additionally, the device may support an application for generating or editing content for computer generated graphics and/or XR environments (e.g., an application with a content generation environment).

The various applications that are executed on the device optionally use a common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

FIG. 1 illustrates an electronic device 100 displaying XR content according to embodiments of the disclosure. In some embodiments, electronic device 100 is a hand-held or mobile device, such as a tablet computer, laptop computer or a smartphone. Examples of device 100 are described below with reference to FIG. 2. As shown in FIG. 1, electronic device 100 and table 120 are located in the physical environment 110. In some embodiments, electronic device 100 may be configured to capture areas of physical environment 110 including table 120 (illustrated in the field of view of electronic device 100). In some embodiments, in response to a trigger, the electronic device 100 may be configured to display a 3D XR object 130 (e.g., a cube illustrated in FIG. 1) positioned on top of an XR representation 120' of real-world table 120. For example, object 130 can be displayed on the surface of the table 120' in the XR environment displayed on device 100 in response to detecting the planar surface of table 120 in the physical environment 110. A user, such as an application developer or 3D environment designer, may desire to create content for an XR environment such as an XR scene including multiple objects. XR content can be created in a content generation environment running on device 100 or another electronic device. The examples described herein describe systems and methods of implementing improved content generation using snap points with varying densities.

Figure 2:
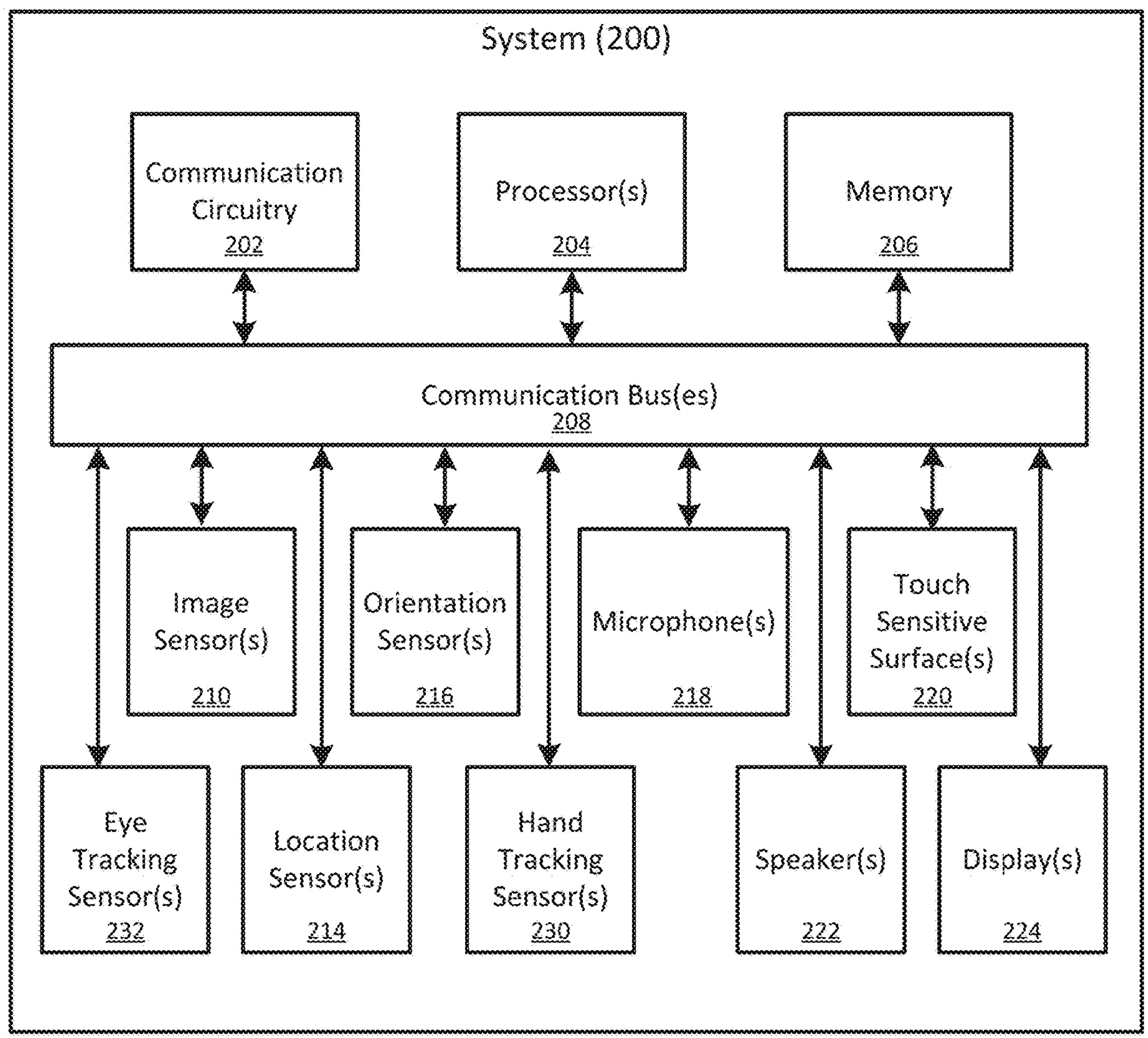
FIG. 2 illustrates a block diagram of exemplary architectures for an electronic device according to embodiments of the disclosure.

FIG. 2 illustrates a block diagram of exemplary architectures for a system or device 200 in accordance with some embodiments. In some embodiments, device 200 is a mobile device, such as a mobile phone (e.g., smart phone), a tablet computer, a laptop computer, a desktop computer, a wearable device, an auxiliary device in communication with another device, etc. In some embodiments, as illustrated in FIG. 2, device 200 includes various components, such as communication circuitry 202, processor(s) 204, memory 206, image sensor(s) 210, location sensor(s) 214, orientation sensor(s) 216, microphone(s) 218, touch-sensitive surface(s) 220, speaker(s) 222, and/or display generation component(s) 224. These components optionally communicate over communication bus(es) 208 of device 200.

Device 200 includes communication circuitry 202. Communication circuitry 202 optionally includes circuitry for communicating with electronic devices, networks, such as the Internet, intranets, a wired network and/or a wireless network, cellular networks and wireless local area networks (LANs). Communication circuitry 202 optionally includes circuitry for communicating using near-field communication and/or short-range communication, such as Bluetooth®.

Processor(s) 204 include one or more general processors, one or more graphics processors, and/or one or more digital signal processors. In some embodiments, memory 206 is a non-transitory computer-readable storage medium (e.g., flash memory, random access memory) that stores computer-readable instructions configured to be executed by processor(s) 204 to perform the techniques, processes, and/or methods described below (e.g., with reference to FIGS. 3A-8, such as method 800 described with respect to FIG. 8). In some embodiments, memory 206 can including more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Device 200 includes display generation component(s) 224. In some embodiments, a display generation component is a hardware component (e.g., including electrical components) capable of receiving display data and displaying a user interface. In some embodiments, display generation component(s) 224 can include a single display such as an LED or LCD display, and in other embodiments the display generation component(s) can include a projector, a display with touch capability, a retinal projector, and the like. In some embodiments, display generation component(s) 224 includes multiple displays. In some embodiments, device 200 includes touch-sensitive surface(s) 220 for receiving user inputs, such as tap inputs and swipe inputs or other gestures. In some embodiments, display generation component(s) 224 and touch-sensitive surface(s) 220 form touch-sensitive display(s) (e.g., a touch screen integrated with device 200 or external to device 200 that is in communication with device 200). Examples of a display generation component include a display screen, a monitor, a projector, a head-mounted display, a wearable device, or any other hardware component that enables a user interface to be viewable by a user.

Device 200 optionally includes image sensor(s) 210. Image sensors(s) 210 optionally include one or more visible light image sensor, such as charged coupled device (CCD) sensors, and/or complementary metal-oxide-semiconductor (CMOS) sensors operable to obtain images of physical objects from the real environment. Image sensor(s) 210 also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 210 also optionally include one or more event camera(s) configured to capture movement of physical objects in the real environment. Image sensor(s) 210 also optionally include one or more depth sensor(s) configured to detect the distance of physical objects from device 200. In some embodiments, information from one or more depth sensor(s) can allow the device to identify and differentiate objects in the real environment from other objects in the real environment. In some embodiments, one or more depth sensor(s) can allow the device to determine the texture and/or topography of objects in the real environment.

In some embodiments, device 200 uses CCD sensors, event cameras, and/or depth sensors in combination to detect the physical environment around device 200. In some embodiments, image sensor(s) 220 include a first image sensor and a second image sensor. The first image sensor and the second image sensor work in tandem and are optionally configured to capture different information of physical objects in the real environment. In some embodiments, the first image sensor is a visible light image sensor and the second image sensor is a depth sensor. In some embodiments, device 200 uses image sensor(s) 210 to detect the position and orientation of device 200 and/or display generation component(s) 224 in the real environment. For example, device 200 uses image sensor(s) 210 to track the position and orientation of display generation component(s) 224 relative to one or more fixed objects in the real environment.

In some embodiments, device 200 includes microphones(s) 218. Device 200 uses microphone(s) 218 to detect sound from the user and/or the real environment of the user. In some embodiments, microphone(s) 218 includes an array of microphones (including a plurality of microphones) that optionally operate in tandem, such as to identify ambient noise or to locate the source of sound in space of the real environment.

Device 200 includes location sensor(s) 214 for detecting a location of device 200 and/or display generation component(s) 224. For example, location sensor(s) 214 can include a GPS receiver that receives data from one or more satellites and allows device 200 to determine the device's absolute position in the physical world.

Device 200 includes orientation sensor(s) 216 for detecting orientation and/or movement of device 200 and/or display generation component(s) 224. For example, device 200 uses orientation sensor(s) 216 to track changes in the position and/or orientation of device 200 and/or display generation component(s) 224, such as with respect to physical objects in the real environment. Orientation sensor(s) 216 optionally include one or more gyroscopes and/or one or more accelerometers.

Device 200 includes hand tracking sensor(s) 230 and/or eye tracking sensor(s) 232, in some embodiments. Hand tracking sensor(s) 230 are configured to track the position/location of one or more portions of the user's hands, and/or motions of one or more portions of the user's hands with respect to the extended reality environment, relative to the display generation component(s) 224, and/or relative to another defined coordinate system. Eye tracking senor(s) 232 are configured to track the position and movement of a user's gaze (eyes, face, or head, more generally) with respect to the real-world or extended reality environment and/or relative to the display generation component(s) 224. In some embodiments, hand tracking sensor(s) 230 and/or eye tracking sensor(s) 232 are implemented together with the display generation component(s) 224. In some embodiments, the hand tracking sensor(s) 230 and/or eye tracking sensor(s) 232 are implemented separate from the display generation component(s) 224.

In some embodiments, the hand tracking sensor(s) 230 can use image sensor(s) 210 (e.g., one or more IR cameras, 3D cameras, depth cameras, etc.) that capture three-dimensional information from the real-world including one or more hands (e.g., of a human user). In some examples, the hands can be resolved with sufficient resolution to distinguish fingers and their respective positions. In some embodiments, one or more image sensor(s) 210 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it does not require the user to touch, hold or wear any sort of beacon, sensor, or other marker.

In some embodiments, eye tracking sensor(s) 232 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s).

Device 200 is not limited to the components and configuration of FIG. 2, but can include other or additional components in multiple configurations. Attention is now directed towards examples of user interfaces ("UI") and associated processes that are implemented on an electronic device, such as device 100 and device 200.

The examples described below provide ways in which an electronic device provides snap points with varying densities in a content generation environment. Efficient user interfaces improve the speed and accuracy of generating content, thereby improving the creation of XR environments and XR objects. These user interfaces also enhance the user's interactions with the electronic device by reducing the difficulties in the object creation process. Enhancing interactions with a device reduces the amount of time needed by a user to perform operations, and thus reduces the power usage of the device and increases battery life for battery-powered devices. When a person uses a device, that person is optionally referred to as a user of the device.

Figure 3A:
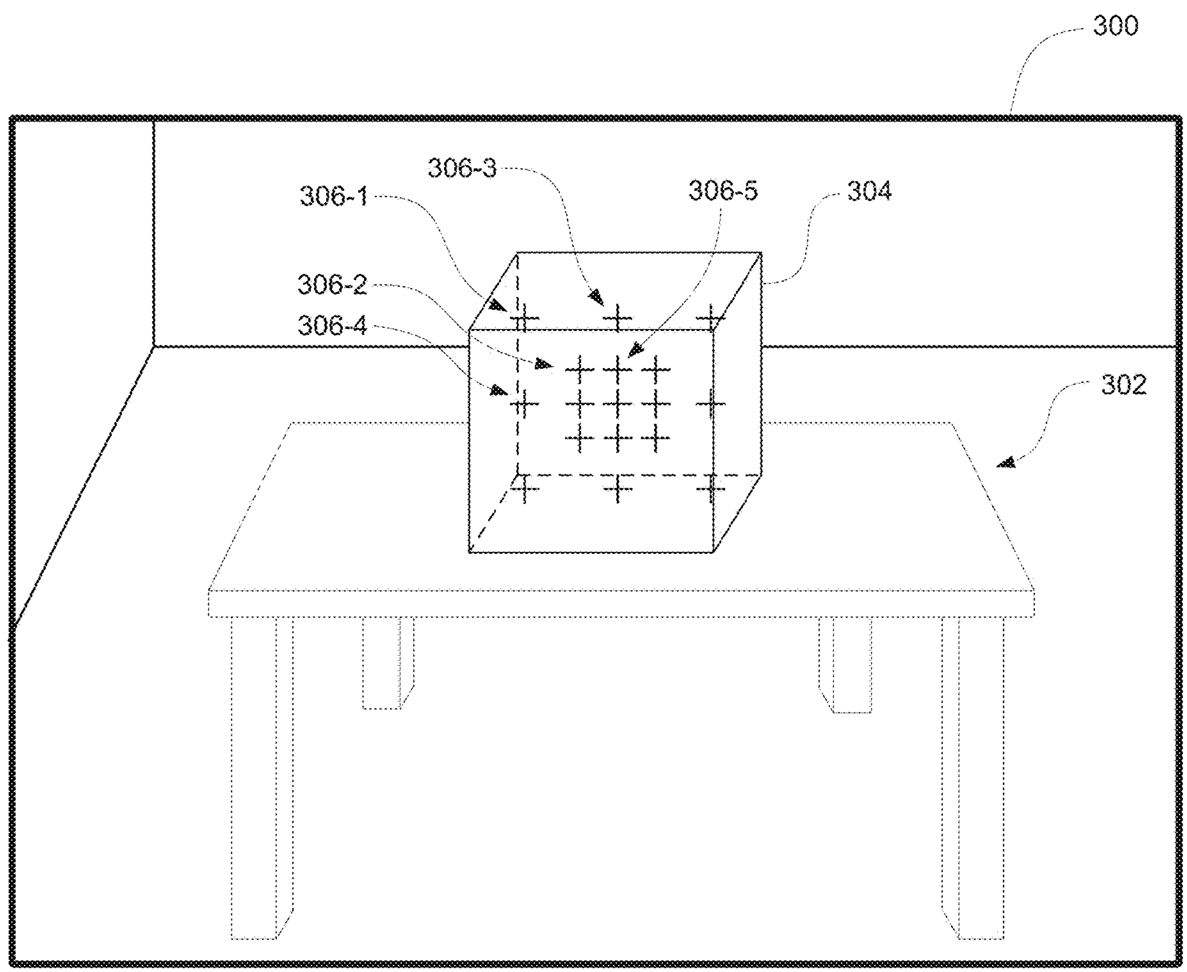
FIGS. 3A-3B illustrate an exemplary content generation environment including varying snap point densities according to embodiments of the disclosure.
Figure 3B:
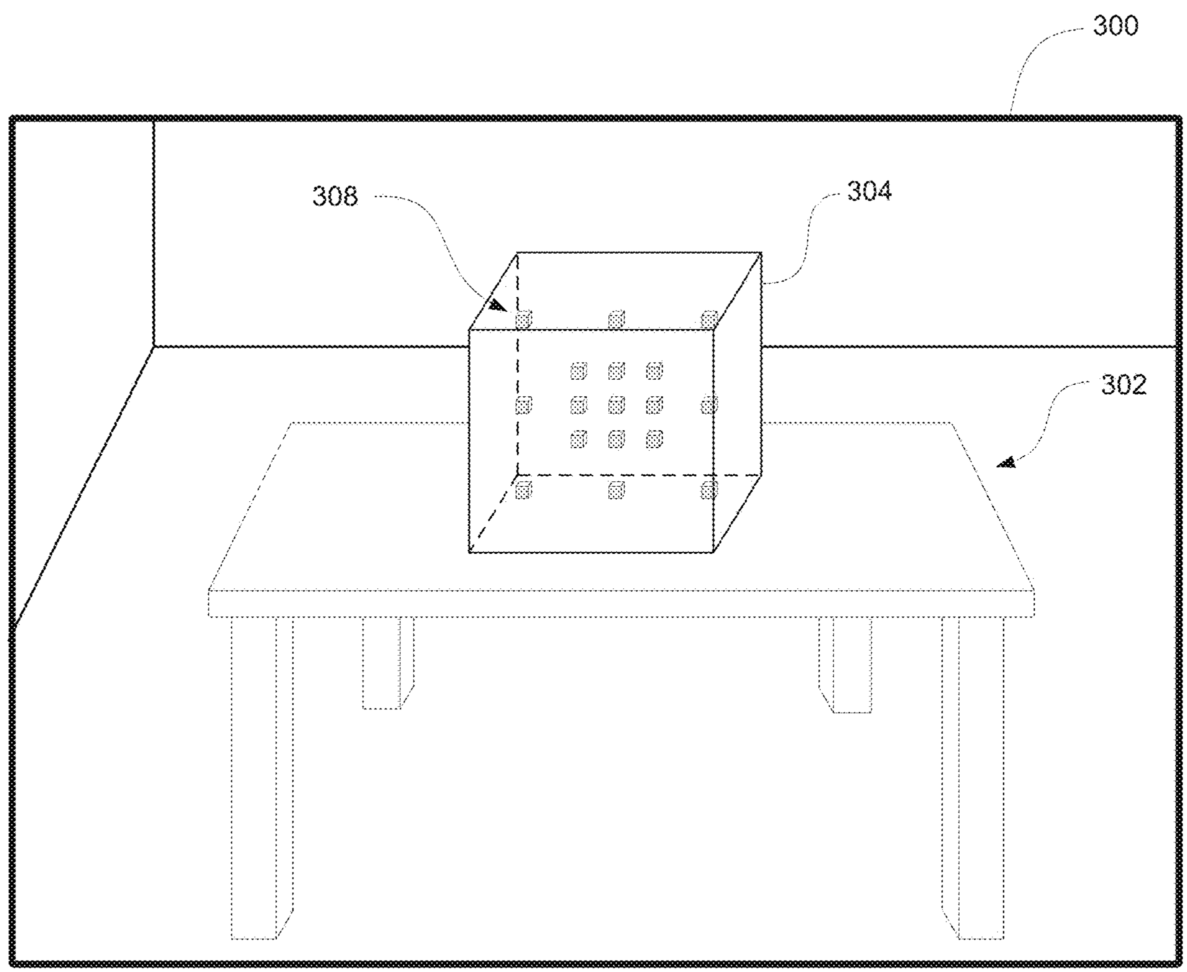

FIGS. 3A-3B illustrate an exemplary content generation environment 300 including varying snap point densities according to embodiments of the disclosure. Content generation environment 300 can be displayed by an electronic device (e.g., similar to device 100 or 200). In some embodiments, content generation environment 300 is displayed by a display device (e.g., a display generation component) that is in communication with the device (e.g., integrated with or external to the device), such as a monitor, a touch screen, a projector, a television, etc. Content generation environment 300 is a user interface of a content editor or content generation application in which a user is able to generate, modify, edit, or otherwise manipulate virtual objects in one or more XR scenes (e.g., XR environments). For example, the virtual objects of the XR scene can be exported or otherwise saved for use in a XR environment (e.g., for use in an XR environment that is not a content generation environment, such as an XR viewer).

In FIG. 3A, content generation environment 300 includes a simulated three-dimensional environment with one or more objects (e.g., three dimensional or two-dimensional objects). In some embodiments, content generation environment 300 is an XR environment that includes a simulated (e.g., virtual) three-dimensional environment. In some embodiments, one or more of the three-dimensional objects in content generation environment 300 can be either virtual objects (e.g., generated by the device) or real-world objects (e.g., objects in the real world environment around the device that are captured by the device and actively displayed to the user or passively made viewable to the user, for example, via a transparent or translucent display), similarly to described above with respect to FIG. 1. In FIG. 3A, content generation environment 300 includes table 302 and object 304 (e.g., a three-dimensional cube). In some embodiments, table 302 is a representation of a table in the physical environment (e.g., such as table 120 are located in the physical environment 110 as described above with respect to FIG. 1). In some embodiments, table 302 is a virtual object generated by the electronic device and displayed in content generation environment 300. Similarly, object 304 can be a virtual object or a representation of a cube in the physical environment.

In some embodiments, content generation environment 300 includes a plurality of snap points 306 located inside of the volume of object 304 (e.g., illustrated in FIG. 3A as a plurality of targets). FIG. 3A illustrates the snap points along one cross-section of object 304 for ease of illustration, but it is understood that a plurality of snap points can be located throughout the volume of object 304 (including at the boundaries of object 304 and optionally outside the volume of object 304). Here, a snap point (e.g., such as snap points 306) is a position (e.g., three-dimensional location) in content generation environment 300 in which a virtual object can be aligned with (e.g., "snapped" to) when the virtual object is brought within a threshold distance from the snap point. For example, during content creation (e.g., during content authoring, content editing, etc.), a respective object can have a plurality of snap points placed along the boundary of the respective object such that a user is able to move a virtual object towards one of the plurality of snap points, and "snap" the virtual object to the boundary of the respective object (e.g., by snapping it to one or more of the snap points on the boundary of the respective object). In this example, because the snap points are placed on the boundary of the respective object, the virtual object is able to be aligned with the boundary of the respective object, without requiring the user to perform minute adjustments or manually edit the numerical positions of the virtual object to align the virtual object with the boundary of the respective object. In other examples, snap points can be placed at or near points of interest (along the boundary of the object or inside the volume of the object), thus allowing a user to align virtual objects to these points of interest. Thus, the device can provide a plurality of snap points in content generation environment 300, allowing a user to place virtual objects at predefined locations or along predefined increments in content generation environment 300.

In some embodiments, the plurality of snap points are provided at the intersections of a three-dimensional grid in content generation environment 300. Thus, in some embodiments, the plurality of snap points can be uniformly spaced in content generation environment 300 and have a constant density. However, in certain situations, objects within the content generation environment 300 may not be placed or aligned with these snap points that are provided in content generation environment 300. Thus, uniformly spaced, constant density snap points may not allow a user to snap or otherwise align a virtual object with objects in content generation environment 300 that are not aligned with the snap points. Thus, there exists a need for snap points to be provided at locations that are customized for or otherwise based on objects in content generation environment 300. For example, providing snap points at and around various points of interests of an object allows a designer to align virtual objects to respective points of interests. Furthermore, uniformly spaced, constant density snap points are not able to allow a user to perform minute adjustments at or near various points of interests of the object (e.g., without changing the snap grid settings for the entire environment). For example, if a content designer is creating a human model, the torso of the human model could have points of interests where arms, legs, a head, organs, bones, etc. are ordinarily attached. Thus, when the designer generates the arms, legs, head, organ, and bone objects, and is seeking to attach these objects to the torso, the designer would benefit from a large number of snap points at these points of interests, thus providing the designer with the ability to perform minute adjustments while ensuring proper alignment with the torso of the human model. Thus, there exists a need for snap points with varying densities (e.g., higher density of snap points in certain areas of content generation environment 300 and lower densities of snap points in other areas of content generation environment 300).

Returning to FIG. 3A, the plurality of snap points 306 have different snap point densities at different locations within object 304. For example, snap point 306-1 located near a boundary of object 304 can be located in an area of low density while snap point 306-2 near the center of object 304 can be located in an area of high density. For example, at the location around snap point 306-1, the distance between adjacent snap points (e.g., in two dimensions or three dimensions) can be larger (e.g., lower density) than the distance between adjacent snap points at the location around snap point 306-2 (e.g., higher density). Thus, the location around snap point 306-1 has fewer snap points per unit cubed as compared to the location around snap point 306-2. For example, the distance between snap point 306-1 and snap point 306-3 (and similarly the distance between snap point 306-1 and snap point 306-4) is larger than the distance between snap point 306-2 and snap point 306-5. As shown in FIG. 3A, the density of the snap points is higher at the center of object 304 and lower near the boundaries of object 304. In some embodiments, as will be described in further detail below, the snap point densities can be a function of the distance from the center of an object, from points of interests of an object, and/or from the boundaries of an object.

For ease of illustration, FIG. 3A illustrates the snap points on one cross-section of object 304 and illustrates an embodiment with two different snap point densities, but it is understood that the plurality of snap points can be located throughout the volume of object 304 and can have any number of different snap point densities. It is also understood that, although FIG. 3A does not illustrate snap points outside of object 304, the device can additionally provide snap points that are not associated with object 304 that are located in content generation environment 300 outside of object 304. In some embodiments, snap points not associated with objects (e.g., snap points located outside of the boundary of objects) can have a uniform and a constant snap point density (e.g., have a snap point density that does not vary).

As described above, the plurality of snap points 306 are associated with object 304 such that the density of snap points and/or the location of particular snap points are based on characteristics of object 304, such as the size, shape, contour, points of interests, etc. In some embodiments, the plurality of snap points 306 can be programmatically generated (e.g., automatically generated by an electronic device, such as device 100 or device 200). For example, content generation environment 300 can provide one or more options that are selectable to automatically generate a set of snap points for an object. In some embodiments, an environment designer is able to select between automatically generating a uniform snap grid or a variable snap grid. In some embodiments, the automatically generated variable snap grid can be configured such that the snap grid begins at the boundaries of the object (e.g., aligned with the boundaries of the object) and extends across the entire volume of the object (optionally having the same shape, size, and/or contour as the object), with the lowest density at the boundaries and the highest density at the center of the object. In some embodiments, content generation environment 300 can provide one or more options to change the snap grid density function (e.g., linear, gaussian, exponential, logarithmic, polynomial, etc.). In some embodiments, changing the snap grid density maintains the density at one or more locations (e.g., such as the boundaries of the object, the center of the object, or the points of interests of the object) while changing how the density of snap points increase or decrease between these locations. In some embodiments, the plurality of snap points 306 can be manually generated or can be manually edited (e.g., after being manually generated or programmatically generated), as will be described in further detail below.

In some embodiments, when the plurality of snap points 306 is associated with object 304, the plurality of snap points 306 is treated as if it is a part of object 304. For example, in response to a user input moving object 304 in content generation environment 300, the plurality of snap points 306 also moves in accordance with the movement of object 304 in content generation environment 300 (e.g., the plurality of snap points and the object move as one unit). In some embodiments, if object 304 is duplicated or otherwise copied, the plurality of snap points 306 is also duplicated or copied. For example, if object 304 is duplicated to generate a second virtual object that is identical to object 304, then a second plurality of snap points is also generated that is identical to the plurality of snap points 306 and is associated with the newly generated virtual object (e.g., the snap points are located at the same respective locations in the newly generated virtual object). Similarly, if object 304 is resized, the plurality of snap points 306 is also resized proportionally (e.g., the snap points move to remain in the same relative position, optionally adding or removing snap points to maintain the same density as before the resizing or optionally not adding or removing any snap points, thereby causing the density to change accordingly). As will be described in further detail below with respect to FIGS. 6A-6C, the plurality of snap points 306 can be disassociated from object 304 and be treated as a standalone object, separate from object 304.

In some embodiments, the snap points are provided in content generation environment 300, but are not displayed or otherwise visible to the user (e.g., a user is able to snap an object to the snap points without requiring display of the snap points). In some embodiments, a user is able to select an option to enable display of the snap points (e.g., all or some snap points). In some embodiments, when displayed, the snap points can be represented by visual elements in content generation environment 300. For example, the snap points can be displayed as targets (e.g., cross-hairs, such as in FIG. 3A) or as three-dimensional elements, such as cubes (e.g., voxels), as shown in FIG. 3B. In FIG. 3B, object 304 includes a plurality of cubes 308 that are located at the respective locations of the snap points (e.g., centered on the respective locations of the snap points). Thus, cubes 308 provide a visual indication of the location of the snap points. In some embodiments, other shapes or other elements can be used, such as spheres, dots, different sized cubes, etc. In some embodiments, all of the provided snap points are displayed in content generation environment 300. In some embodiments, only a subset of the provided snap points are displayed in content generation environment 300. In some embodiments, if a user has indicated an interest in a respective location in content generation environment 300, then the snap points at or near the respective location can be displayed (e.g., 3, 5, 10, 20, etc. of the nearby snap points are displayed) while the other snap points are not displayed (e.g., to simplify the display, reduce the visual noise, etc.). For example, if a user is moving a virtual object in content generation environment 300, then as the virtual object approaches within a threshold distance (optionally the threshold distance is larger than the threshold distance that causes the virtual object to snap to a respective snap point) of one or more snap points, the one or more snap points can be revealed (e.g., displayed), thus displaying the relevant snap points to which the user can snap the virtual object, while hiding the snap points that is outside of the threshold distance. Thus, as the user moves a virtual object around content generation environment 300, the snap points around content generation environment 300 can be revealed and hidden based on the location of the virtual object as it moves around content generation environment 300. In some embodiments, one or more visual characteristics of the snap points can change based on the distance of the virtual object from the respective snap points. For example, a snap point can increase in opacity as a virtual object moves closer to it (e.g., from a minimum opacity level to a maximum opacity level), or a snap point can change color as the virtual moves closer to it (e.g., from a "cooler" color to a "warmer" color, or vice versa).

Figure 4A:
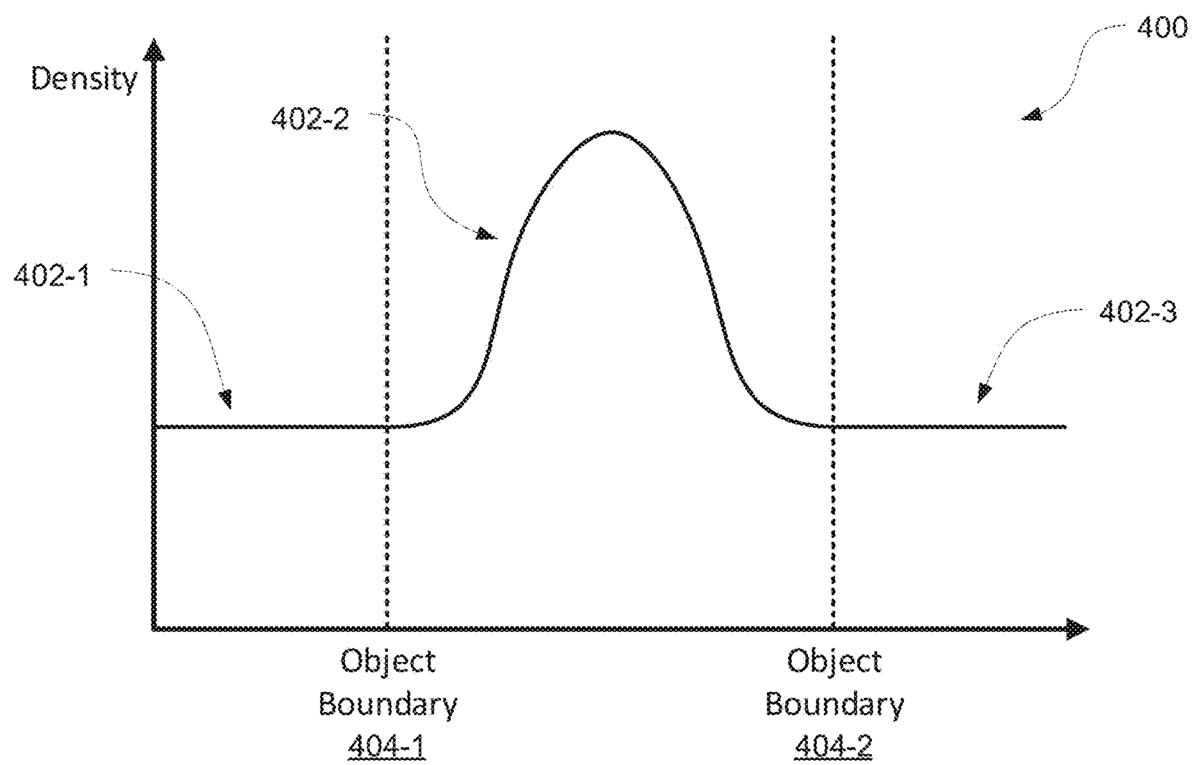
FIGS. 4A-4B illustrate graphs of exemplary density functions of snap points in a content generation environment according to embodiments of the disclosure.
Figure 4B:
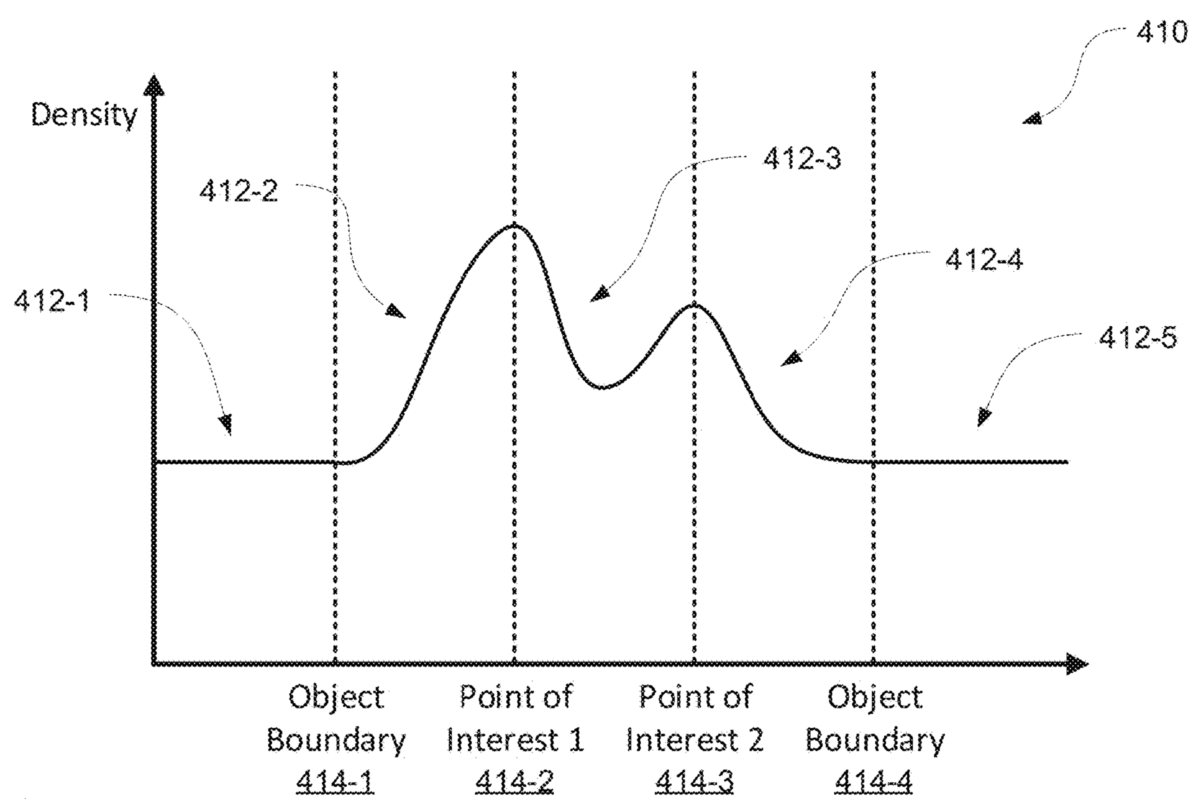

FIGS. 4A-4B illustrate graphs of exemplary density functions of snap points in a content generation environment according to embodiments of the disclosure. Graph 400 is an exemplary density function plotted against position in the content generation environment along the x-axis, and snap point density along the y-axis. In FIG. 4A, graph 400 illustrates the varying snap point densities along a cross-section of a content generation environment (e.g., such as content generation environment 300) that includes at least one object (e.g., such as table 302 or object 304). Graph 400 includes two object boundaries, object boundary 404-1 and object boundary 404-2. For ease of description, graph 400 is organized into portion 402-1, portion 402-2, and portion 402-3. In FIG. 4A, the area between object boundary 404-1 and object boundary 404-2 (e.g., portion 402-2 of graph 400) is the area inside of the object and the area to the left of object boundary 404-1 (e.g., portion 402-1 of graph 400) and to the right of object boundary 404-2 (e.g., portion 402-3 of graph 400) is outside of the object. As shown, the density of snap points at portion 402-1 and portion 402-3 are optionally a constant value (e.g., uniform). In some embodiments, the density of snap points at portion 402-1 and portion 402-3 can vary, but does not vary based on characteristics of the object (e.g., not based on distance from an object boundary, distance from the center of the object, or distance from points of interest in the object).

In some embodiments, the density of snap points in portion 402-2 (e.g., within the boundary of the object) changes as a function of position. In some embodiments, the density increases gradually from the boundary of the object (optionally where the density is the same as the density of snap points outside of the object), and reaches a peak density value at or near the center of the object. In some embodiments, the density is a function of the distance from one or more of the boundaries of the object and/or distance from the center of the object. In some embodiments, the density of the snap points in portion 402-2 can be sinusoidal, gaussian, normally distributed, linear (e.g., linearly increasing, then linearly decreasing, optionally with a plateau in the center), exponential, logarithmic, polynomial, any other suitable continuous or discontinuous function (e.g., step-wise or piece-wise function). As will be described in further detail below with respect to FIG. 7A-7B, a user is optionally able to edit or otherwise modify the density of the snap points at any location to any arbitrary level based on the user's needs and the density of the snap points is not limited to any particular function.

FIG. 4B illustrates graph 410 of an alternative exemplary density function plotted against position in the content generation environment along the x-axis, and snap point density along the y-axis. Graph 410 illustrates the varying snap point densities along a cross-section of a content generation environment (e.g., such as content generation environment 300) that includes at least one object (e.g., such as table 302 or object 304). In FIG. 4B, the object in the content generation environment includes a first object boundary 414-1, a first point of interest 414-2, a second point of interest 414-3, and a second object boundary 414-4. Examples of points of interest include, but are not limited to, attachment locations, junction points, corners, curves, etc. Other examples of points of interests include locations on a head object (e.g., head model) for hair, eyes, ears, nose, mouth, etc., locations on a house object (e.g., house model) for doors, windows, steps, etc.

For ease of description, graph 410 is organized into portion 412-1 to the left of object boundary 414-1 (e.g., outside of the object), portion 412-2 between object boundary 414-1 and the first point of interest 414-2, portion 412-3 between the first point of interest 414-2 and the second point of interest 414-3, portion 412-4 between the second point of interest 414-3 and object boundary 414-4, and portion 412-5 to the right of object boundary 414-4 (e.g., outside of the object). As shown in FIG. 4B, the density of snap points in portion 412-1 and portion 412-5 are optionally a constant value (e.g., uniform), or otherwise not based on characteristics (e.g., distances from boundaries or points of interests) of objects in the content generation environment.

In some embodiments, the density of snap points in portions 412-2, 412-3, and 412-4 (e.g., within the boundary of the object) change as a function of position within the object. For example, in portion 412-2, the density of snap points can increase from a minimum level at object boundary 414-1 to its maximum level at the first point of interest 414-2. Portion 412-3 can decrease from its maximum level at the first point of interest 414-2 to a local minima, and then increase to a peak level at the second point of interest 414-3. Portion 412-4 can decrease from its maximum level at the second point of interest 414-3 to its minimum level at object boundary 414-4. Thus, as shown, if an object has one or more points of interest, either at the boundary or within the boundary of the object, then the density of snap points can be increased at or around the points of interest. As shown, graph 410 can have local maximum and local minimum values and is not limited to just a single peak or a single maximum and minimum level. For example, the density at the first point of interest 414-2 is higher than the density at the second point of interest 414-2, and the density at the local minima of portion 412-3 is higher than the densities at portions 412-1 and 412-5. Furthermore, different points of interest can have different densities, for example, based on whether the respective points of interest can benefit from higher resolution adjustments. In some embodiments, the points of interests can be set by the designer of the object or can be automatically identified by an electronic device. In some embodiments, a designer is able to set the density levels at the various points of interests and the electronic device interpolates (e.g., automatically generates) the snap point densities for the areas between the points of interests and the object boundaries.

It is understood that graphs 400 and 410 provided above are examples of the varying density levels, and this disclosure is not limited to the features illustrated in FIGS. 4A-4B.

Figure 5A:
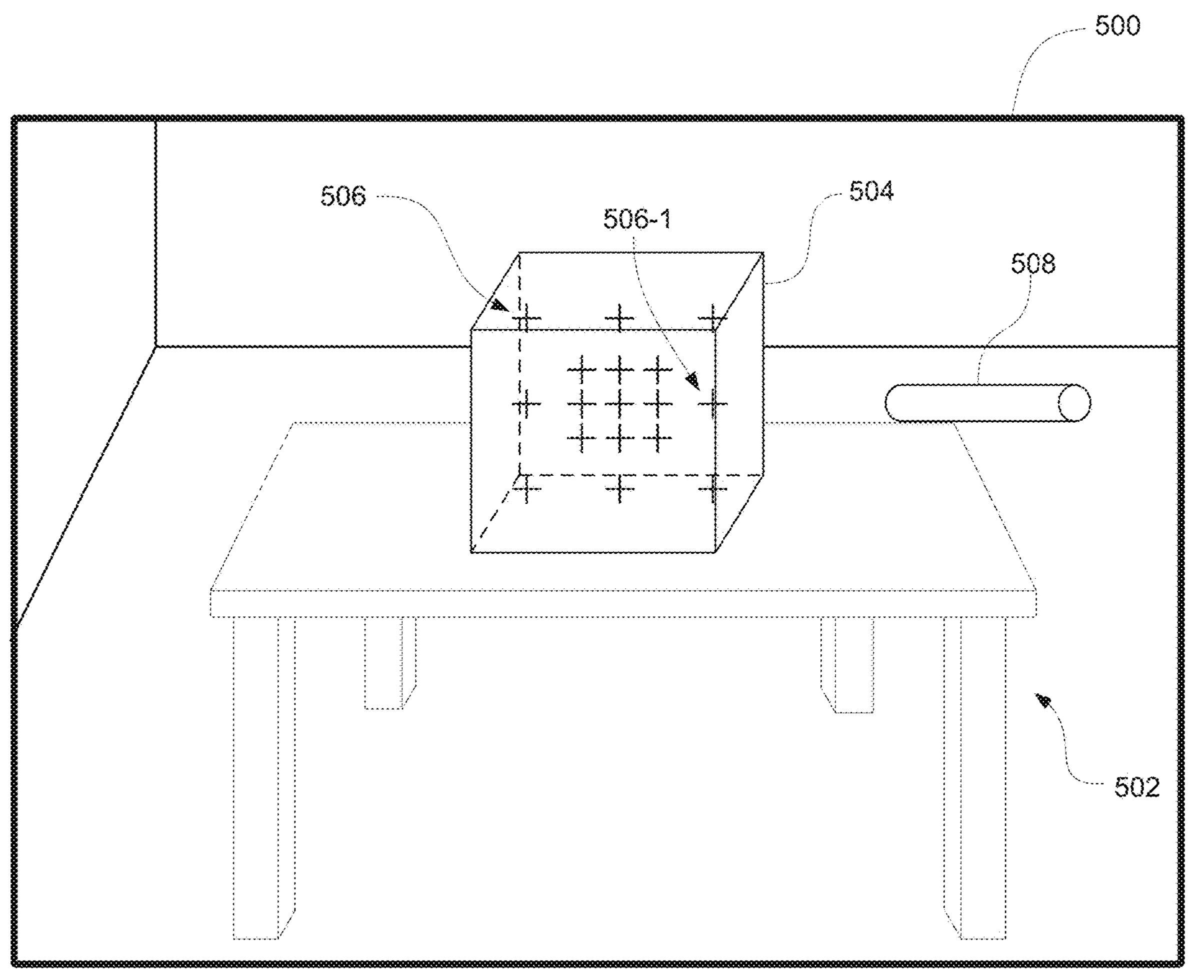
FIGS. 5A-5C illustrate an exemplary method of placing a virtual object at a respective snap location according to embodiments of the disclosure.
Figure 5B:
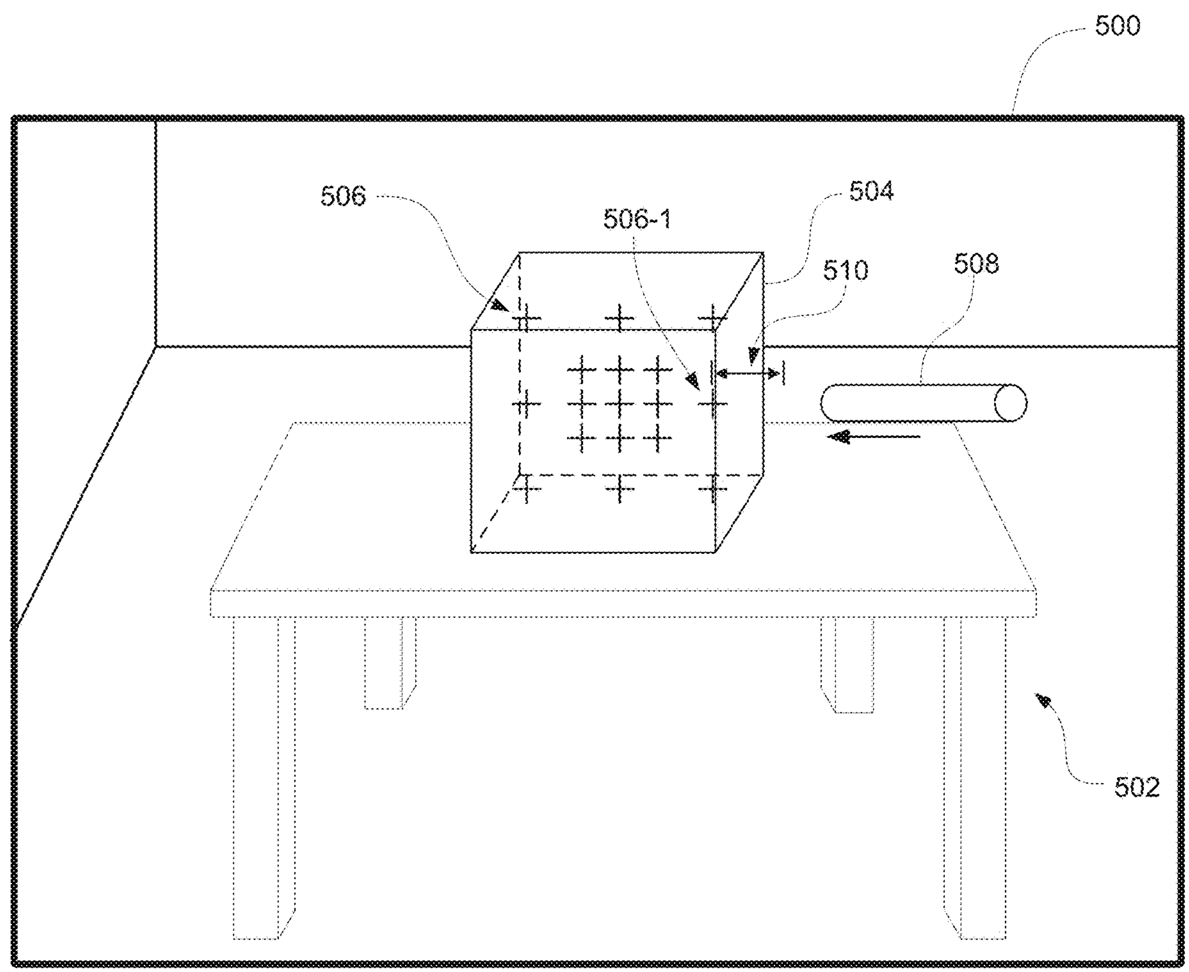
Figure 5C:
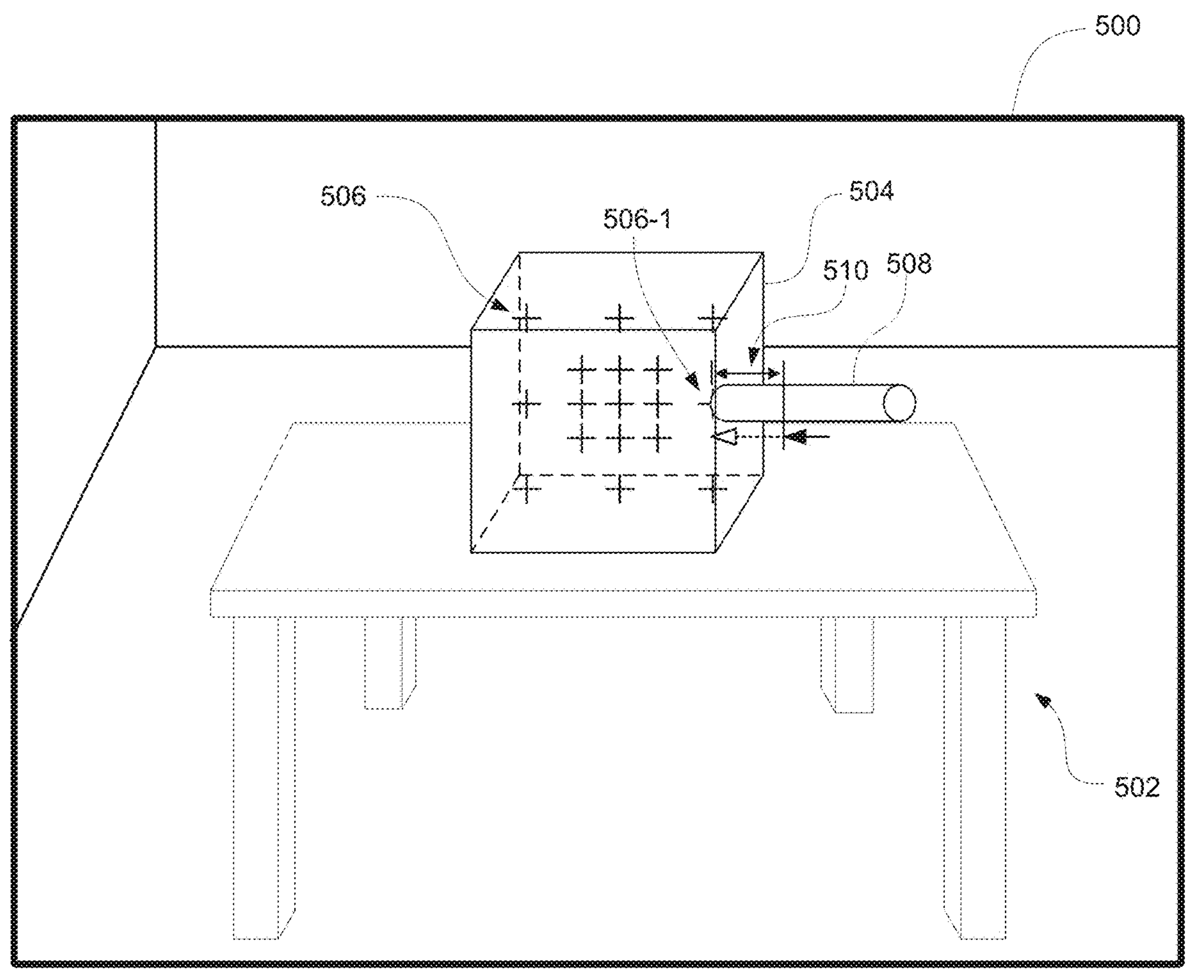

FIGS. 5A-5C illustrate an exemplary method of placing a virtual object at a respective snap location according to embodiments of the disclosure. In FIG. 5A, content generation environment 500 includes a simulated three-dimensional environment with table 502, cube 504 (e.g., similar to content generation environment 300 described above with respect to FIGS. 3A-3B, the details of which are not repeated here for brevity), and cylinder 508. In some embodiments, cylinder 508 is a virtual object in content generation environment 500. As shown in FIG. 5A, object 504 includes a plurality of snap points 506 (e.g., with varying densities, similar to the snap points described above with respect to FIGS. 3A-4B).

In FIG. 5B, cylinder 508 is moved leftwards towards object 504. In some embodiments, cylinder 508 is moved leftwards in response to and/or while receiving a user input moving cylinder 508 leftwards. In FIG. 5B, the closest boundary of cylinder 508 is farther than threshold distance 510 from snap point 506-1. In some embodiments, threshold distance 510 can be a fixed distance (e.g., 1 mm, 5 mm, 1 cm, 3 cm, 10 cm, etc.) or can depend on the density of snap points (e.g., equal to half of the distance to the next snap point, a third of the distance to the next snap point, a fourth of the distance to the next snap point, etc.). In FIG. 5B, because cylinder 508 is more than the threshold distance 510 from snap point 506-1 (e.g., optionally more than a threshold distance from any other snap point), cylinder 508 is able to move freely and proportionally with the user input (e.g., in accordance with the movement component of the user input).

FIG. 5C illustrates cylinder 508 being moved further leftwards to within the threshold distance 510 from snap point 506-1. As shown, a user input is received that includes a movement component moving cylinder 508 leftwards by a first amount (e.g., illustrated by the solid arrow). In response to and/or in accordance with a determination that the closest boundary of cylinder 508 is within the threshold distance 510 of snap point 506-1, the electronic device moves cylinder 508 by a second amount (e.g., illustrated by the dotted line and hollow arrow), as shown in FIG. 5C. In some embodiments, cylinder 508 "snaps" to the location of snap point 506-1 such that the closest boundary of cylinder 508 (e.g., left-most boundary of cylinder 508) is at the location of snap point 506-1. Thus, cylinder 508 "snaps" to the location of snap point 506-1 without the user input including a movement component moving cylinder 508 to the location of snap point 506-1. In this way, the electronic device is able to guide the user and align virtual objects to particular positions in content generation environment 500.

In some embodiments, alternatively to immediately snapping to snap point 506-1 discussed above, when cylinder 508 is within the threshold distance 510 from snap point 506-1, cylinder 508 moves towards snap point 506-1 by more than the proportional amount of the movement component of the user input (e.g., as if cylinder 508 is magnetically attracted to snap point 506-1 and moves more than if cylinder 508 were able to move freely while farther than the threshold distance 510 from snap point 506-1). Thus, as described above, when cylinder 508 is less than the threshold distance 510 from snap point 506-1, cylinder 508 optionally does not move proportionally with the user input and instead is "attracted" to snap point 506-1 (e.g., either by immediately snapping to snap point 506-1 or by moving by more than the user input suggests).

In some embodiments, while cylinder 508 is snapped to snap point 506-1, a user is able to move cylinder 508 away from snap point 506-1 via a user input moving cylinder 508 away from snap point 506-1. In some embodiments, a threshold amount of movement is required to pull cylinder 508 away from snap point 506-1.

Figure 6A:
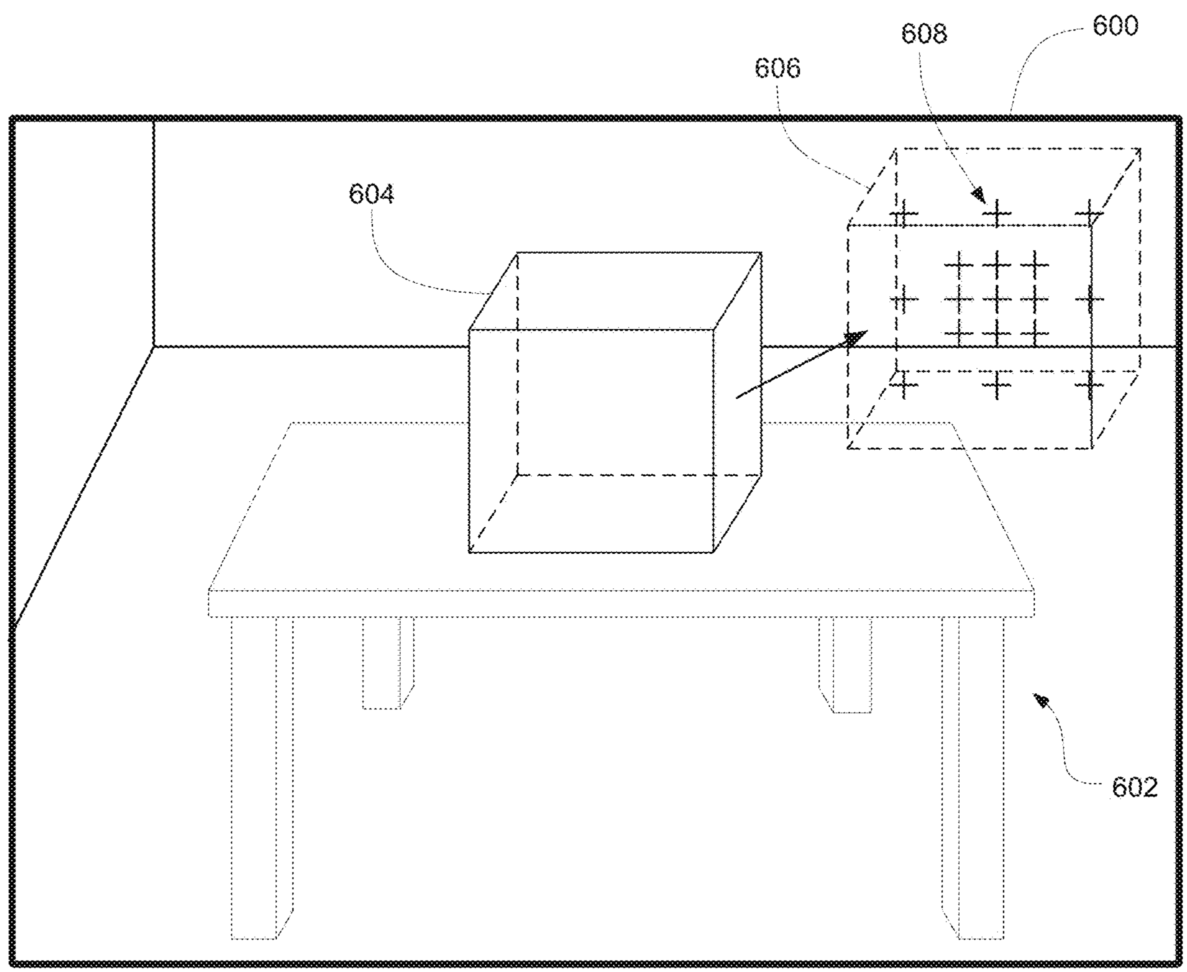
FIGS. 6A-6C illustrate an exemplary method of disassociating a plurality of snap points from an object according to embodiments of the disclosure.
Figure 6B:
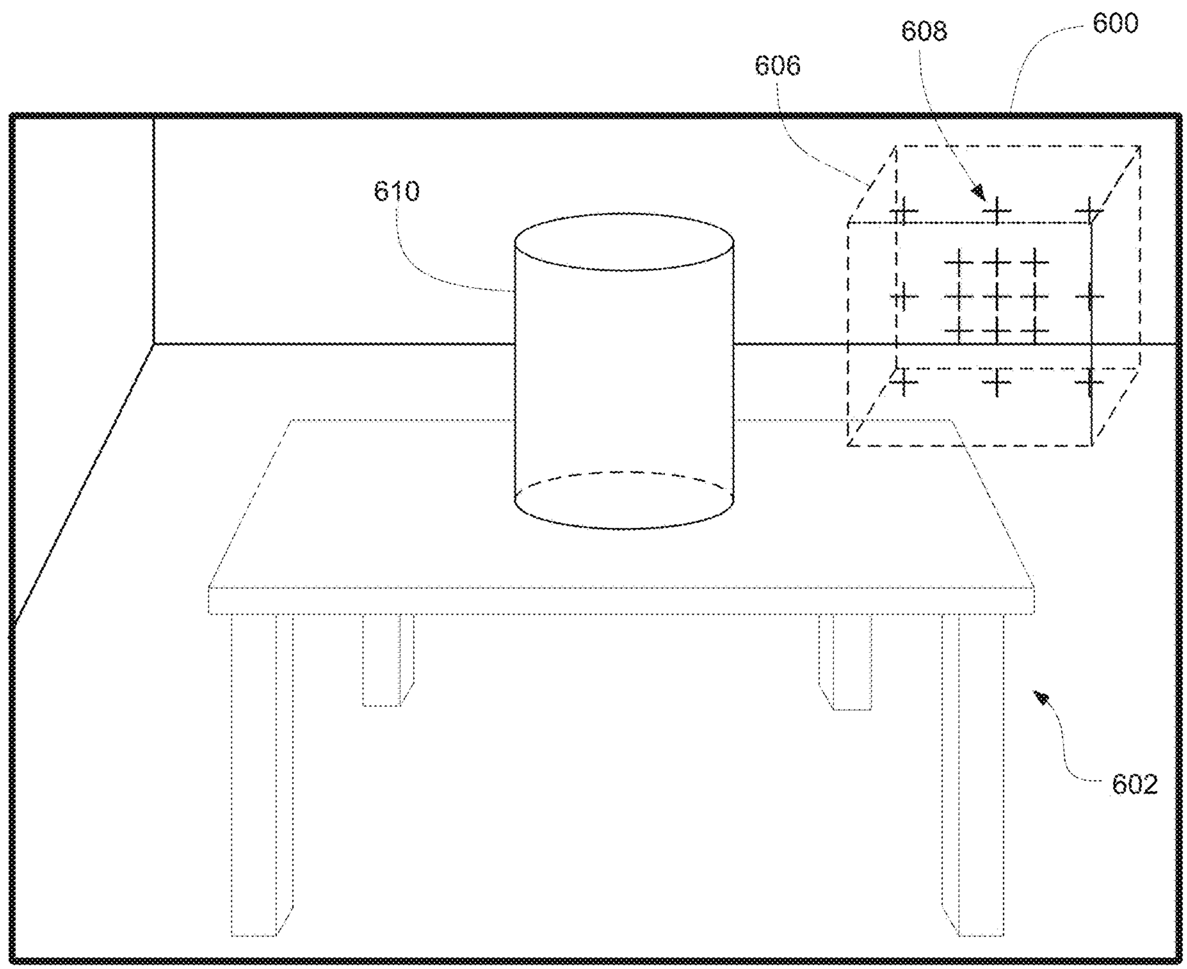
Figure 6C:
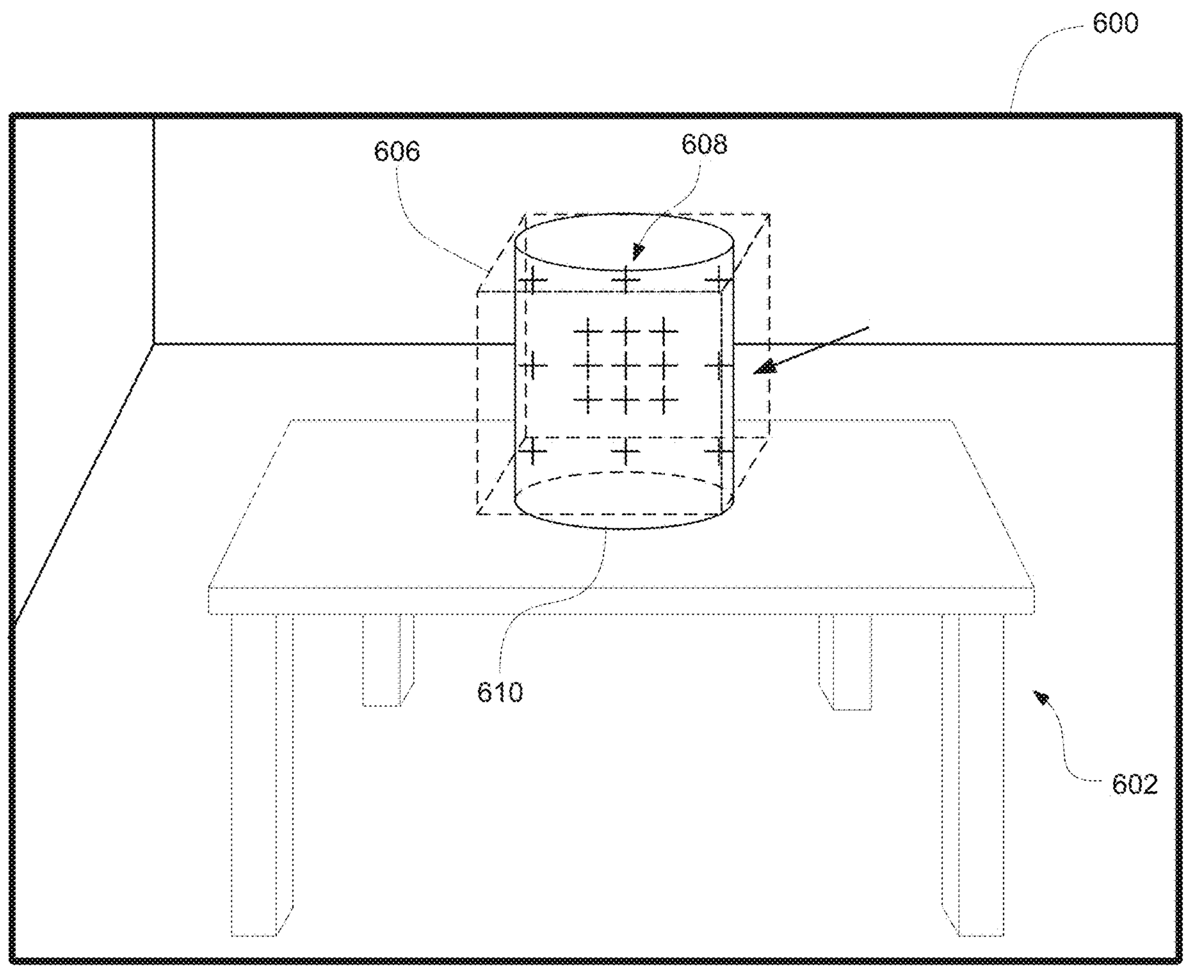

FIGS. 6A-6C illustrate an exemplary method of disassociating a plurality of snap points from an object according to embodiments of the disclosure. As described above with respect to FIG. 3A, a plurality of snap points can be associated with an object. For example, a set of snap points can be generated specifically for a particular object, with varying densities based on the characteristics of that object. Furthermore, a user can customize the snap points and adjust the densities and snap locations for a particular object. However, after generating a set of snap points for a particular object, a user may desire to export the set of snap points and use them as snap points for another object or generally other locations in the content generation environment. Thus, in some embodiments, a user is able to request that the set of snap points that are associated with an object be disassociated from the object and treated as an object separate from the object with which they were associated.

In FIG. 6A, content generation environment 600 includes a simulated three-dimensional environment with table 602 and cube 604 (e.g., similar to content generation environment 300 described above with respect to FIGS. 3A-3B, the details of which are not repeated here for brevity). In FIG. 6A, the plurality of snap points 608 has been disassociated from cube 604 (e.g., in response to a user input requesting the disassociation). In some embodiments, a snap object 606 is generated that includes the plurality of snap points 608 and has a size that is equal or similar to the size of cube 604 (e.g., optionally the same size, shape, and/or contour). Thus, snap object 606 is a container object that includes the plurality of snap points 608 distributed within snap object 606 in the same way as when the snap points were associated with cube 604. In some embodiments, snap object 606 is treated similarly to and behaves like a virtual object and can be moved and manipulated without moving or manipulating cube 604 (optionally causing the snap points within snap object 606 to be moved or manipulated in the same way as if the snap points were associated with an object and the object was moved or manipulated). Similarly, after disassociating the plurality of snap points 608 from cube 604, cube 604 can be moved or manipulated without moving or manipulating snap object 606. In addition, after disassociating the plurality of snap points 608 from cube 604, duplicating cube 604 does not duplicate the plurality of snap points 608. In some embodiments, if snap object 606 is moved to a location away from cube 604, then cube 604 optionally has no snap points or cube 604 has a default snap density (e.g., a uniform snap density similar to locations in content generation environment 600 outside of cube 604). In some embodiments, after disassociating the plurality of snap points 608 from cube 604, the plurality of snap points 608 can be re-associated with cube 604 (e.g., and re-aligned with cube 604, optionally dissolving snap object 606).

In some embodiments, snap object 606 is a transparent object and only functions in a content editing environment (e.g., during object or environment editing mode), such as content generation environment 600. For example, when the objects generated in a content generation environment or an entire XR environment is exported and viewed in an XR viewer (e.g., during "runtime"), snap object 606 optionally does not exist in the exported environment or optionally is transparent and otherwise not interactable. In some embodiments, snap object 606 is a metadata object that defines snap locations and is otherwise not visible to an end user. However, snap object 606 can be exported into another content generation environment and used to apply varying snap densities to the other content generation environment.

As shown in FIG. 6A, snap object 606 can be placed anywhere in content generation region 600 and can be moved away from the location of cube 604. In some embodiments, the snap points 608 in snap object 606 are active even when snap object 606 is placed at locations other than cube 604. For example, in FIG. 6A, if the user moves a virtual object toward a snap point in snap object 606, the virtual object can snap to the respective snap point. Thus, the plurality of snap points 608 need not be associated with an object for the snap points to provide the snapping functionality described above. In some embodiments, if a virtual object is snapped to a respective snap point in snap object 606, moving snap object 606 does not cause the virtual object to move with the snap object 606 (e.g., optionally the virtual object remains in the same location). Thus, snap object 606 can be moved to different locations of content generation environment 600 to increase the snapping resolution of the respective locations. In some embodiments, virtual objects snapped to snap locations in snap object 606 move with snap object 606 when snap object 606 is moved.

FIG. 6B illustrates an exemplary content generation environment 600 with snap object 606 and cylinder 610 instead of cube 604. FIG. 6B can illustrate a situation in which a user disassociated snap points 608 from cube 604 and then removed cube 604 and added cylinder 610. In another example, FIG. 6B can illustrate a situation in which a user exported snap object 606 (e.g., without exporting cube 604) into another XR environment that includes cylinder 610. As shown in FIG. 6B, even when content generation environment 600 does not include cube 604, snap object 606 maintains its shape (e.g., size, contour, etc.), distribution of snap locations, and snap location densities.

FIG. 6C illustrates snap object 606 being moved to at least partially overlap with cylinder 610 (e.g., in response to a user input moving snap object 606). In this way, the plurality of snap points 608 are now placed at locations around and/or within cylinder 610 (e.g., depending on the alignment of snap object 606 with cylinder 610). In some embodiments, the original snap points are replaced by snap points 608 in snap object 606 (e.g., the original snap points are no longer provided). As shown in FIG. 6C, snap object 606 need not be perfectly aligned with cylinder 610 and can overlap with multiple objects (e.g., overlap with parts of cylinder 610 and parts of other objects, such as table 602). Thus, a user is able to apply the snap points of snap object 606, including the varying densities that have already been generated (e.g., automatically and/or by the user) to other object(s). For example, if the snap points at the center of snap object 606 have a desired density, instead of going through the process of re-generating snap points with the desired density at the desired location, a user can use snap object 606 and move it such that the center of snap object 606 is positioned at the desired location. This enables the user to use the snap densities of snap object 606 for cylinder 610 (e.g., without associating snap object 606 with cylinder 610 and without generating a new set of snap locations for cylinder 610, as described above).

Figure 7A:
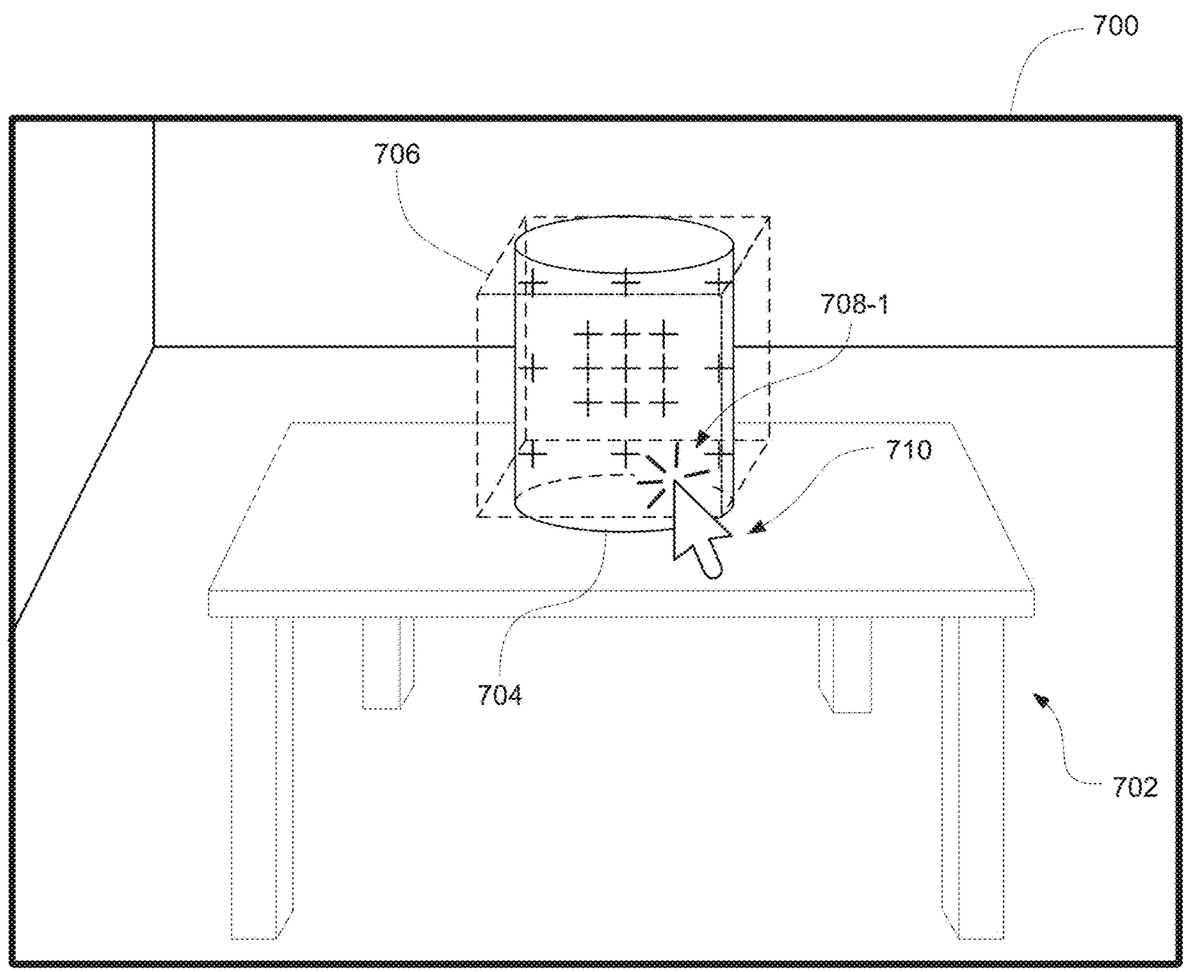
FIGS. 7A-7B illustrate an exemplary method of modifying a plurality of snap points according to embodiments of the disclosure.
Figure 7B:
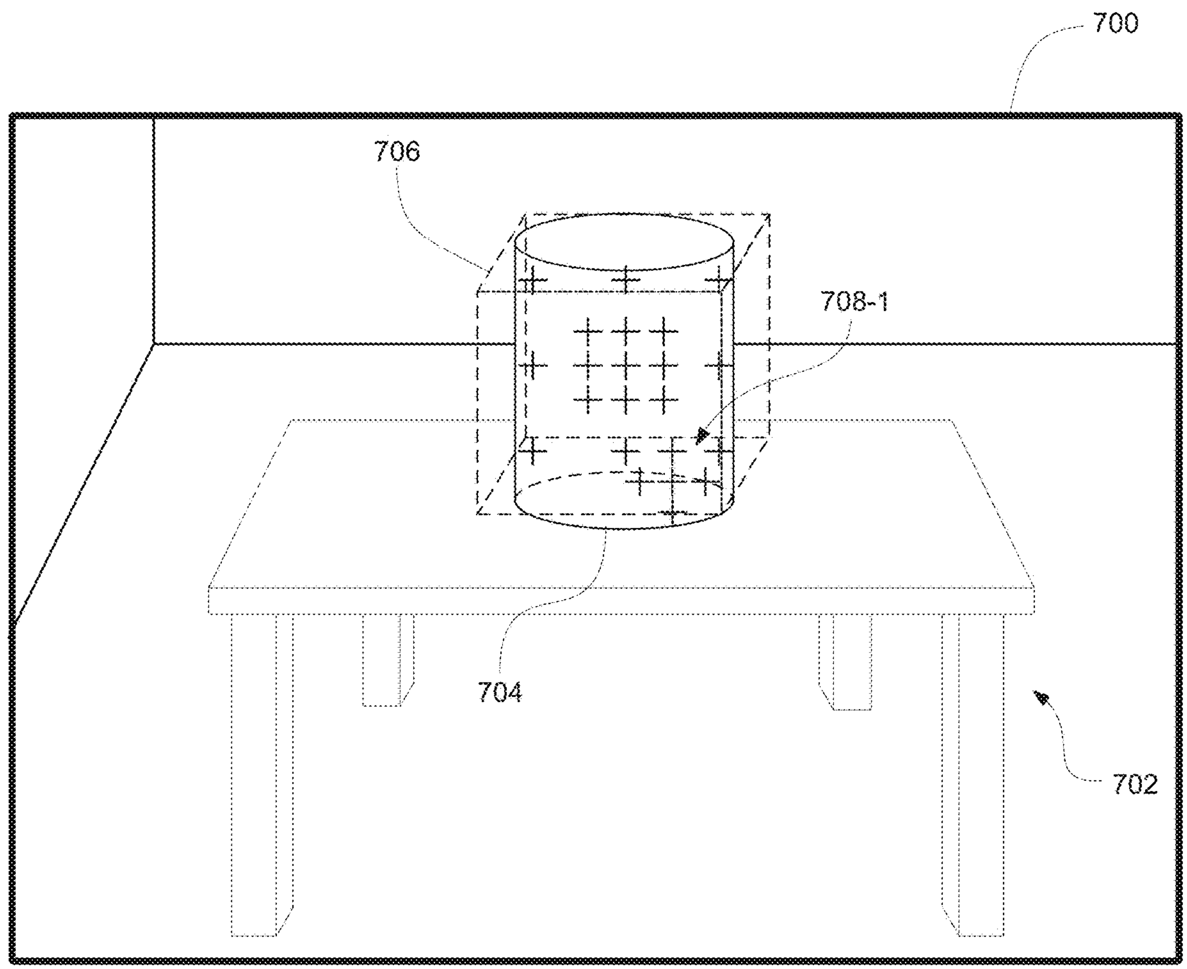

FIGS. 7A-7B illustrate an exemplary method of modifying a plurality of snap points according to embodiments of the disclosure. In FIG. 7A, content generation environment 700 includes a simulated three-dimensional environment with table 702, cylinder 704, and snap object 706 placed over at least a portion of cylinder 704 (e.g., similar to described above with respect to FIGS. 6A-6C, the details of which are not repeated here for brevity).

In FIG. 7A, a user input 710 is received corresponding to a request to add snap points to location 708-1 of cylinder 704. In some embodiments, user input 710 is a request to increase the density of snap points at location 708-1 of cylinder 704 (e.g., a three-dimensional location in the volume of cylinder 704). For example, user input 710 can be a selection of an option to increase the density of snap points followed by a selection of location 708-1. In some embodiments, a user is able to provide the desired density (e.g., provide a numerical snap points-per-inch value, etc.), adjust the density curve (e.g., adjust certain parts of the density function, such as graph 400 or graph 410, up or down), add or remove specific snap points, etc. In response to user input 710, the number of snap points at or around location 708-1 can be increased (e.g., new snap points are created) or the density of snap points at or around location 708-1 can be increased, as shown in FIG. 7B. In some embodiments, a user is able to increase the density of snap points at or around location 708-1, without changing the density of snap points at other locations. For example, the change is localized to the area at or around location 708-1. In some embodiments, further user inputs can be received to further increase the density or generate additional new snap points at location 708-1 (e.g., the user input can be a request to increase or decrease the density by a certain increment).

Although FIGS. 7A-7B illustrate a user adding snap points or otherwise increasing the density of snap points at a location 708-1 in cylinder 704, it is understood that a user is able to similarly decrease the density of snap points or remove snap points from a particular location in snap object 706. In some embodiments, a user is able to increase or decrease the density of snap points overall (e.g., across the board, at all locations in snap object 706). In some embodiments, a user is able to change any aspect of the snap points. For example, the user is able to change individually add or remove snap points or change the density function to modify the location of the local maximums, local minimums, global maximums, global minimums, the slopes, the inflection points, etc. A user is also able to change the density of snap points anywhere in content generation environment 700, outside of snap object 706. For example, a user is able to create a snap object with varying densities (e.g., similar to snap object 606) and place the snap object anywhere in content generation environment 700 (e.g., creating snap object 606 from scratch, without requiring the user to disassociate snap points from an object to generate the snap object).

It is understood that although FIG. 7A-7B illustrate the modification of the snap points for a snap object that is not associated with an object, the features described herein similarly apply to snap points that are associated with an object, such as the plurality of snap points 306 located inside the volume of object 304 in FIG. 3A.

Figure 8:
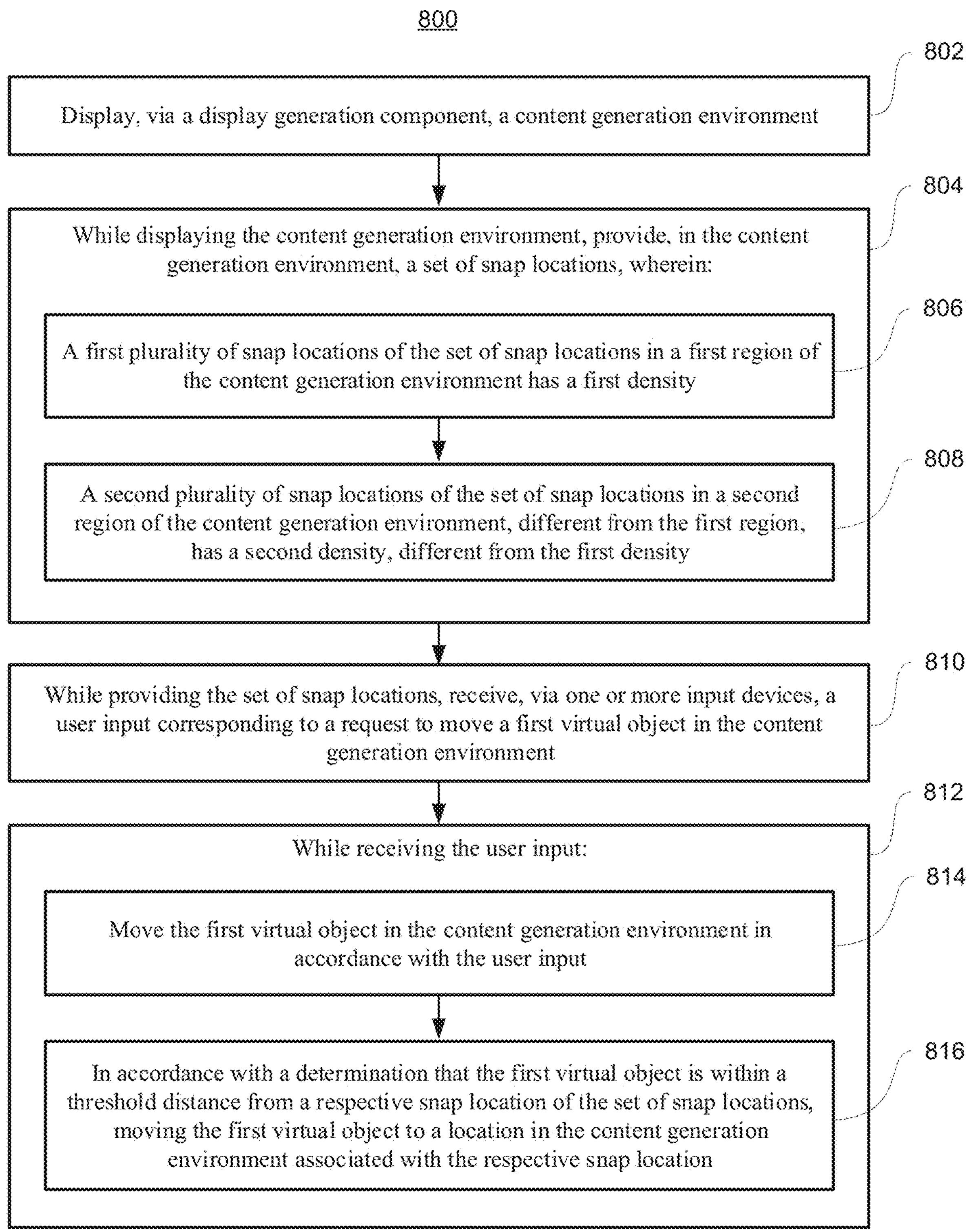
FIG. 8 is a flow diagram illustrating a method of providing varying snap densities according to embodiments of the disclosure.

FIG. 8 is a flow diagram illustrating method 800 of providing varying snap densities according to embodiments of the disclosure. The method 800 is optionally performed at an electronic device such as device 100, and device 200 when providing the varying snap densities described above with reference to FIGS. 3A-3B, 4A-4B, 5A-5C, 6A-6C, and 7A-7B. Some operations in method 800 are, optionally combined and/or order of some operations is, optionally, changed. As described below, the method 800 provides methods of providing varying snap densities in accordance with embodiments of the disclosure (e.g., as discussed above with respect to FIGS. 3-7).

In some embodiments, an electronic device (e.g., a mobile device (e.g., a tablet, a smartphone, a media player, or a wearable device), a computer, etc. such as device 100 and/or device 200) in communication with a display generation component (e.g., a display integrated with the electronic device (optionally a touch screen display) and/or an external display such as a monitor, projector, television, etc.) and one or more input devices (e.g., a touch screen, mouse (e.g., external), trackpad (optionally integrated or external), touchpad (optionally integrated or external), remote control device (e.g., external), another mobile device (e.g., separate from the electronic device), a handheld device (e.g., external), a controller (e.g., external), a camera (e.g., visible light camera), a depth sensor and/or a motion sensor (e.g., a hand tracking sensor, a hand motion sensor), etc.) displays (802), via the display generation component, a content generation environment, such as content generation environments 300, 500, 600, and 700 described above. In some embodiments, while displaying the content generation environment, the electronic device provides (804), in the content generation environment, a set of snap locations, such as snap points 306 in FIG. 3A. In some embodiments, a first plurality of snap locations of the set of snap locations in a first region of the content generation environment has a first density (806), such as snap points 306-1, 306-3, and 306-4 near the boundary of object 304 having a low density in FIG. 3A. In some embodiments, a second plurality of snap locations of the set of snap locations in a second region of the content generation environment, different from the first region, has a second density, different from the first density (808), such as snap points 306-2 and 306-5 near the center of object 304 having a high density in FIG. 3A. In some embodiments, while providing the set of snap locations, the electronic device receives (810), via the one or more input devices, a user input corresponding to a request to move a first virtual object in the content generation environment, such as the movement of cylinder 508 toward object 504 in FIG. 5B. In some embodiments, while receiving the user input (812), the electronic device moves (814) the first virtual object in the content generation environment in accordance with the user input, such as in FIG. 5B. In some embodiments, in accordance with a determination that the first virtual object is within a threshold distance from a respective snap location of the set of snap locations, the electronic device moves (e.g., snaps) (816) the first virtual object to a location in the content generation environment associated with the respective snap location, such as cylinder 508 snapping to snap point 506-1 in FIG. 5C. In some embodiments, the first virtual object snaps to the respective snap location when and in response to the distance between the first virtual object and the respective snap location becoming less than the threshold distance. In some embodiments, the first virtual object snaps to the respective snap location in response to detecting a termination of the user input (e.g., a release of a selection input, the release of a mouse click, etc.) when the first virtual object is within the threshold distance of the respective snap location (e.g., the first virtual object does not snap to the respective snap location if the first virtual object is not within the threshold distance of the respective snap location when the termination of the user input is detected). In some embodiments, while the first virtual object is within the threshold distance of the respective snap location, a visual indicator is displayed and/or the respective snap location is displayed with an emphasized visual characteristic (e.g., as compared to the other snap locations) to indicate that upon termination of the user input, the first virtual object will snap to the respective snap location (e.g., when the first visual object is farther than the threshold distance from the respective snap location, the visual indicator is not displayed and/or the respective snap location is not visually emphasized).

Additionally or alternatively, in some embodiments, providing the set of snap locations includes displaying one or more elements at one or more locations in the content generation environment associated with one or more snap locations of the set of snap locations. Additionally or alternatively, in some embodiments, in accordance with a determination that the first virtual object is within a second threshold distance from the one or more snap locations, the electronic device displays the one or more elements. Additionally or alternatively, in some embodiments, in accordance with a determination that the first virtual object is not within the second distance from the one or more snap locations, the electronic device forgoes displaying the one or more elements.

Additionally or alternatively, in some embodiments, the content generation environment includes a second object and the set of snap locations is associated with the second object. In some embodiments, the second object is a virtual object, different from the first virtual object. In some embodiments, the second object is a representation of real-world object (e.g., a photorealistic depiction of an object in the physical world around the electronic device that is captured by the electronic device and displayed (e.g., via a pass-through video) or allowed to be viewable by the electronic device (e.g., via a transparent or translucent display)). Additionally or alternatively, in some embodiments, a density of the set of snap locations is a function of a distance from a boundary of the second object. Additionally or alternatively, in some embodiments, a density of the set of snap locations is a function of a distance from a center of the second object.

Additionally or alternatively, in some embodiments, the set of snap locations is located within the second object and has a density based on the second object. Additionally or alternatively, in some embodiments, a second set of snap locations located in the content generation environment outside of the second object has a density not based on the second object. Additionally or alternatively, in some embodiments, while the set of snap locations is associated with the second object, the electronic device receives, via the one or more input devices, a second user input corresponding to a request to move the second object. Additionally or alternatively, in some embodiments, in response to receiving the second user input, the electronic device moves the second object in the content generation environment in accordance with the second user input and moving the set of snap locations in accordance with the movement of the second object.

Additionally or alternatively, in some embodiments, while the set of snap locations is associated with the second object, the electronic device receives, via the one or more input devices, a third user input corresponding to a request to duplicate the second object. Additionally or alternatively, in some embodiments, in response to receiving the third user input, the electronic device duplicates the second object, including duplicating the set of snap locations. Additionally or alternatively, in some embodiments, while the set of snap locations is associated with the second object, the electronic device receives, via the one or more input devices, a fourth user input corresponding to a request to disassociate the set of snap locations from the second object. Additionally or alternatively, in some embodiments, in response to receiving the fourth user input, the electronic device disassociates the set of snap locations from the second object, wherein the set of snap locations is configured to move in the content generation environment without moving the second object and the second object is configured to move in the content generation environment without moving the set of snap locations.

Additionally or alternatively, in some embodiments, while the set of snap locations is not associated with the second object, the electronic device moves the set of snap locations to a location in the content generation environment associated with one or more objects other than the second object. Additionally or alternatively, in some embodiments, the electronic device changes a density of a respective plurality of snap locations of the set of snap locations in accordance with a request to change the density of the respective plurality of snap locations, without changing a density of snap locations other than the respective plurality of snap locations.

Additionally or alternatively, in some embodiments, the user input corresponding to the request to move the first virtual object in the content generation environment includes a movement component moving the first virtual object to a first location, other than the location associated with the respective snap location and does not include a movement component moving the first virtual object to the location associated with the respective snap location. Additionally or alternatively, in some embodiments, while receiving the user input, in accordance with a determination that the first virtual object is not within a threshold distance from the respective snap location, the electronic device forgoes moving the first virtual object to the location associated with the respective snap location.

Additionally or alternatively, in some embodiments, while receiving the user input, in accordance with a determination that the first virtual object is within the threshold distance from a second respective snap location of the set of snap locations, the electronic device moves the first virtual object to a second location in the content generation environment associated with the second respective snap location. Additionally or alternatively, in some embodiments, the first plurality of snap locations includes a first snap location and a second snap location, adjacent to the first snap location, wherein a distance between the first snap location and the second snap location is a first distance. Additionally or alternatively, in some embodiments, the second plurality of snap locations includes a third snap location and a fourth snap location, adjacent to the third snap location, wherein a distance between the third snap location and the fourth snap location is a second distance, different from the first distance.

It should be understood that the particular order in which the operations in FIG. 8 have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general-purpose processors (e.g., as described with respect to FIG. 2) or application specific chips. Further, the operations described above with reference to FIG. 8 are, optionally, implemented by components depicted in FIG. 2.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:

at an electronic device in communication with a display and one or more input devices:

displaying, via the display, a content generation environment;

while displaying the content generation environment, providing, in the content generation environment, a set of snap locations, wherein:

a first plurality of snap locations of the set of snap locations in a first region of the content generation environment has a first density; and a second plurality of snap locations of the set of snap locations in a second region of the content generation environment, different from the first region, has a second density, different from the first density;

while providing the set of snap locations, receiving, via the one or more input devices, a user input corresponding to a request to move a first virtual object in the content generation environment; and while receiving the user input:

moving the first virtual object in the content generation environment in accordance with the user input;

in accordance with a determination that the first virtual object is within a threshold distance from a respective snap location of the set of snap locations, moving the first virtual object to a location in the content generation environment associated with the respective snap location;

in accordance with a determination that the first virtual object is within a second threshold distance from a first portion of the set of snap locations, displaying one or more first elements at one or more locations in the content generation environment associated with the first portion of the set of snap locations;

in accordance with a determination that the first virtual object is within the second threshold distance from a second portion, different from the first portion, of the set of snap locations, displaying one or more second elements at one or more second locations, different from the one or more locations, in the content generation environment associated with the second portion of the set of snap locations; and in accordance with a determination that the first virtual object is not within the second threshold distance from the first portion or the second portion of the set of snap locations, forgoing displaying the one or more first elements and the one or more second elements in the content generation environment.

2. The method of claim 1, wherein the content generation environment includes an object and the set of snap locations is associated with the object.

3. The method of claim 2, wherein a density of the set of snap locations is a function of a distance from a boundary of the object.

4. The method of claim 2, wherein a density of the set of snap locations is a function of a distance from a center of the object.

5. The method of claim 2, wherein:

the set of snap locations is located within the object and has a density based on the object; and a second set of snap locations located in the content generation environment outside of the object has a density not based on the object.

6. The method of claim 2, further comprising:

while the set of snap locations is associated with the object, receiving, via the one or more input devices, a second user input corresponding to a request to move the object; and in response to receiving the second user input, moving the object in the content generation environment in accordance with the second user input and moving the set of snap locations in accordance with movement of the object.

7. The method of claim 2, further comprising:

while the set of snap locations is associated with the object, receiving, via the one or more input devices, a second user input corresponding to a request to duplicate the object; and in response to receiving the second user input, duplicating the object, including duplicating the set of snap locations.

8. The method of claim 2, further comprising:

while the set of snap locations is associated with the object, receiving, via the one or more input devices, a second user input corresponding to a request to disassociate the set of snap locations from the object; and in response to receiving the second user input, disassociating the set of snap locations from the object, wherein the set of snap locations is configured to move in the content generation environment without moving the object and the object is configured to move in the content generation environment without moving the set of snap locations.

9. The method of claim 8, further comprising:

while the set of snap locations is not associated with the object, moving the set of snap locations to a location in the content generation environment associated with one or more second objects other than the object.

10. The method of claim 1, wherein:

the first plurality of snap locations includes a first snap location and a second snap location, adjacent to the first snap location, wherein a distance between the first snap location and the second snap location is a first distance; and the second plurality of snap locations includes a third snap location and a fourth snap location, adjacent to the third snap location, wherein a distance between the third snap location and the fourth snap location is a second distance, different from the first distance.

11. The method of claim 1, wherein the content generation environment includes one or more objects including a first object, and the set of snap locations are displayed within the first object in the content generation environment, the method further comprising:

while displaying the set of snap locations within the first object in the content generation environment, receiving a second user input corresponding to a request to move the set of snap locations to a respective location in the content generation environment not associated with the one or more objects; and in response to receiving the second user input, moving the set of snap locations to the respective location in the content generation environment not associated with the one or more objects while the first object is stationary in the content generation environment.

12. An electronic device, comprising:

one or more processors;

memory; and one or more programs, wherein the one or more programs are stored in the memory and configured to be executed by the one or more processors, the one or more programs including instructions for:

displaying, via a display, a content generation environment including one or more objects;

while displaying the content generation environment, providing, in the content generation environment, a set of snap locations within a first object of the one or more objects, wherein:

a first plurality of snap locations of the set of snap locations in a first region of the content generation environment has a first density; and a second plurality of snap locations of the set of snap locations in a second region of the content generation environment, different from the first region, has a second density, different from the first density;

while providing the set of snap locations within the first object, receiving, via one or more input devices, a user input corresponding to a request to move a first virtual object in the content generation environment; and while receiving the user input:

moving the first virtual object in the content generation environment in accordance with the user input;

in accordance with a determination that the first virtual object is within a threshold distance from a respective snap location of the set of snap locations, moving the first virtual object to a location in the content generation environment associated with the respective snap location;

in accordance with a determination that the first virtual object is within a second threshold distance from one or more snap locations of the set of snap locations, displaying one or more elements at one or more locations in the content generation environment associated with the one of more snap locations of the set of snap locations;

in accordance with a determination that the first virtual object is not within the second threshold distance from the one or more snap locations of the set of snap locations, forgoing displaying the one or more elements at the one or more locations in the content generation environment; and while providing the set of snap locations within the first object, receiving, via the one or more input devices, a second user input corresponding to a request to move the set of snap locations to a respective location in the content generation environment not associated with the one or more objects; and in response to receiving the second user input, moving the set of snap locations to the respective location in the content generation environment not associated with the one or more objects while the first object is stationary in the content generation environment.

13. The electronic device of claim 12, wherein the one or more programs further include instructions for changing a density of a respective plurality of snap locations of the set of snap locations in accordance with a request to change the density of the respective plurality of snap locations, without changing a density of snap locations other than the respective plurality of snap locations.

14. The electronic device of claim 12, wherein the user input corresponding to the request to move the first virtual object in the content generation environment includes a movement component corresponding to moving the first virtual object to a first location, other than the location associated with the respective snap location.

15. The electronic device of claim 12, wherein the one or more programs further include instructions for:

while receiving the user input:

in accordance with a determination that the first virtual object is not within a threshold distance from the respective snap location, forgoing moving the first virtual object to the location associated with the respective snap location.

16. The electronic device of claim 12, wherein the one or more programs further include instructions for:

while receiving the user input:

in accordance with a determination that the first virtual object is within the threshold distance from a second respective snap location of the set of snap locations, moving the first virtual object to a second location in the content generation environment associated with the second respective snap location.

17. The electronic device of claim 12, wherein:

the first plurality of snap locations includes a first snap location and a second snap location, adjacent to the first snap location, wherein a distance between the first snap location and the second snap location is a first distance; and the second plurality of snap locations includes a third snap location and a fourth snap location, adjacent to the third snap location, wherein a distance between the third snap location and the fourth snap location is a second distance, different from the first distance.

18. A non-transitory computer readable storage medium storing one or more programs, the one or more programs comprising instructions, which when executed by one or more processors of an electronic device, cause the electronic device to:

display, via a display, a content generation environment;

while displaying the content generation environment, provide, in the content generation environment, a set of snap locations, wherein:

a first plurality of snap locations of the set of snap locations in a first region of the content generation environment has a first density; and a second plurality of snap locations of the set of snap locations in a second region of the content generation environment, different from the first region, has a second density, different from the first density;

while providing the set of snap locations, receive, via one or more input devices, a user input corresponding to a request to move a first virtual object in the content generation environment; and while receiving the user input:

move the first virtual object in the content generation environment in accordance with the user input;

in accordance with a determination that the first virtual object is within a threshold distance from a respective snap location of the set of snap locations, move the first virtual object to a location in the content generation environment associated with the respective snap location;

in accordance with a determination that the first virtual object is within a second threshold distance from a first portion of the set of snap locations, display one or more first elements at one or more locations in the content generation environment associated with the first portion of the set of snap locations;

in accordance with a determination that the first virtual object is within the second threshold distance from a second portion, different from the first portion, of the set of snap locations, display one or more second elements at one or more second locations, different from the one or more locations, in the content generation environment associated with the second portion of the set of snap locations; and in accordance with a determination that the first virtual object is not within the second threshold distance from the first portion or the second portion of the set of snap locations, forgo displaying the one or more first elements and the one or more second elements in the content generation environment.

19. The non-transitory computer readable storage medium of claim 18, wherein the instructions, when executed by the one or more processors of the electronic device, further cause the electronic device to change a density of a respective plurality of snap locations of the set of snap locations in accordance with a request to change the density of the respective plurality of snap locations, without changing a density of snap locations other than the respective plurality of snap locations.

20. The non-transitory computer readable storage medium of claim 18, wherein the user input corresponding to the request to move the first virtual object in the content generation environment includes a movement component corresponding to moving the first virtual object to a first location, other than the location associated with the respective snap location.

21. The non-transitory computer readable storage medium of claim 18, wherein the instructions, when executed by the one or more processors of the electronic device, further cause the electronic device to:

while receiving the user input:

in accordance with a determination that the first virtual object is not within a threshold distance from the respective snap location, forgo moving the first virtual object to the location associated with the respective snap location.

22. The non-transitory computer readable storage medium of claim 18, wherein the instructions, when executed by the one or more processors of the electronic device, further cause the electronic device to:

while receiving the user input:

in accordance with a determination that the first virtual object is within the threshold distance from a second respective snap location of the set of snap locations, move the first virtual object to a second location in the content generation environment associated with the second respective snap location.

23. The non-transitory computer readable storage medium of claim 18, wherein:

the first plurality of snap locations includes a first snap location and a second snap location, adjacent to the first snap location, wherein a distance between the first snap location and the second snap location is a first distance; and the second plurality of snap locations includes a third snap location and a fourth snap location, adjacent to the third snap location, wherein a distance between the third snap location and the fourth snap location is a second distance, different from the first distance.

24. The non-transitory computer readable storage medium of claim 18, wherein the content generation environment includes one or more objects including a first object, and the set of snap locations are displayed within the first object in the content generation environment, and wherein the instructions, when executed by the one or more processors of the electronic device, further cause the electronic device to:

while displaying the set of snap locations within the first object in the content generation environment, receive a second user input corresponding to a request to move the set of snap locations to a respective location in the content generation environment not associated with the one or more objects; and in response to receiving the second user input, move the set of snap locations to the respective location in the content generation environment not associated with the one or more objects while the first object is stationary in the content generation environment.

* * * * *